(12) United States Patent
Kakuwa et al.

(10) Patent No.: US 11,456,467 B2
(45) Date of Patent: Sep. 27, 2022

(54) SOLID OXIDE FUEL CELL AND ELECTROCHEMICAL CELL

(71) Applicant: Panasonic Intellectual Property Management Co., Ltd., Osaka (JP)

(72) Inventors: Takashi Kakuwa, Osaka (JP); Hiromi Kita, Nara (JP); Tomoya Kamata, Osaka (JP); Masatoshi Nakamura, Osaka (JP); Tomohiro Kuroha, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 84 days.

(21) Appl. No.: 16/516,874

(22) Filed: Jul. 19, 2019

(65) Prior Publication Data
US 2020/0044263 A1    Feb. 6, 2020

(30) Foreign Application Priority Data

Aug. 1, 2018   (JP) .............................. JP2018-144835

(51) Int. Cl.
*H01M 8/0271* (2016.01)
*H01M 8/1213* (2016.01)
(Continued)

(52) U.S. Cl.
CPC ............. *H01M 8/0271* (2013.01); *C25B 9/19* (2021.01); *H01M 8/1213* (2013.01); *H01M 8/2425* (2013.01); *H01M 2008/1293* (2013.01)

(58) Field of Classification Search
CPC ...... H01M 8/02; H01M 8/0271; H01M 8/028; H01M 8/0284
See application file for complete search history.

(56) References Cited

U.S. PATENT DOCUMENTS

2005/0017055 A1    1/2005  Kurz et al.
2005/0019642 A1    1/2005  Hishitani et al.
(Continued)

FOREIGN PATENT DOCUMENTS

JP       2011-210589 A         10/2011
JP       2011210589 A    *    10/2011
(Continued)

OTHER PUBLICATIONS

The Extended European Search Report dated Jan. 2, 2020 for the related European Patent Application No. 19188561.5.
(Continued)

*Primary Examiner* — Barbara L Gilliam
*Assistant Examiner* — Jordan E Berresford
(74) *Attorney, Agent, or Firm* — McDermott Will & Emery LLP

(57) ABSTRACT

A solid oxide fuel cell including unit cells, including: a pair of interconnectors for electrically connecting the unit cells; a membrane-electrode assembly including an electrolyte membrane and a pair of electrode layers disposed with the electrolyte membrane therebetween; a pair of current collectors disposed between the electrode layers and the interconnectors so as to be in contact with the pair of electrode layers and the pair of interconnectors, respectively, and electrically connecting the pair of electrode layers and the pair of interconnectors; and elastic bodies biasing at least
(Continued)

one current collector of the pair of current collectors toward a corresponding electrode layer and made of austenitic stainless steel.

20 Claims, 13 Drawing Sheets

(51) Int. Cl.
    *H01M 8/2425* (2016.01)
    *H01M 8/12* (2016.01)
    *C25B 9/19* (2021.01)

(56) References Cited

U.S. PATENT DOCUMENTS

| | | | |
|---|---|---|---|
| 2005/0042494 A1* | 2/2005 | Yuh | H01M 8/0276 |
| | | | 429/509 |
| 2006/0040156 A1 | 2/2006 | Tano et al. | |
| 2008/0152982 A1 | 6/2008 | Horiuchi et al. | |
| 2009/0061300 A1 | 3/2009 | Ringel | |
| 2011/0269047 A1* | 11/2011 | Tucker | H01M 4/9033 |
| | | | 429/452 |
| 2012/0034541 A1* | 2/2012 | Muraoka | H01M 8/0247 |
| | | | 429/456 |
| 2015/0372319 A1* | 12/2015 | Yagi | H01M 8/2483 |
| | | | 429/465 |
| 2015/0380774 A1* | 12/2015 | Koike | G01R 31/3842 |
| | | | 429/90 |

FOREIGN PATENT DOCUMENTS

| | | |
|---|---|---|
| JP | 5346402 B | 11/2013 |
| JP | 2014-026843 | 2/2014 |
| JP | 5685349 B | 3/2015 |
| JP | 5837253 B | 12/2015 |
| JP | 2016-066608 | 4/2016 |
| WO | 2014/118866 | 8/2014 |

OTHER PUBLICATIONS

Yuichi Fukumura et al., "Development of Heat-Resistant Stainless Steel with Excellent Spring Properties at High Temperature for Exhaust Gasket", Proceedings of Spring Research, No. 60, Dec. 15, 2015, pp. 1-6.

* cited by examiner

SOLID OXIDE FUEL CELL AND ELECTROCHEMICAL CELL

BACKGROUND

1. Technical Field

The present disclosure relates to a solid oxide fuel cell that includes two electrode layers, a fuel electrode layer and an air electrode layer, on both surfaces of a membrane-electrode assembly and generates electricity by supplying a fuel gas containing hydrogen to the fuel electrode layer and supplying an oxidant gas to the air electrode layer and also relates to an electrochemical cell such as a solid oxide electrolysis cell.

2. Description of the Related Art

In a fuel battery, a single unit cell cannot provide high power generation output. Accordingly, a fuel battery realizes higher power generation output by stacking a plurality of unit cells (integration). Hereinafter, a stack of unit cells is referred to as a cell stack.

When the shape of the unit cells constituting a cell stack is, for example, a flat plate, a predetermined amount of load is applied to the whole cell stack along the stacking direction of the unit cells. In addition, it is necessary to maintain the gas sealing properties between the respective unit cells and to reduce the electrical contact resistance between the electrode layer and the current collector of each unit cell for maintaining good current collection performance. Incidentally, in realizing such a configuration, it has been difficult to keep balance between gas sealing properties and electrical contact resistance that differ in optimum value.

For example, Japanese Patent Nos. 5346402, 5685349, and 5837253 (hereinafter, referred to as PTLs 1, 2, and 3, respectively) propose fuel batteries having configurations for reducing electrical contact resistance. PTLs 1 and 2 propose fuel batteries each including a pair of interconnectors, a cell main body located between the interconnectors and having an air electrode formed on one surface of the electrolyte and a fuel electrode formed on the other surface, current collectors disposed between the air electrode and the interconnector or between the fuel electrode and the interconnector and electrically connecting between the air electrode and the interconnector or between the fuel electrode and the interconnector, and spacers disposed between the current collectors. In the fuel batteries according to PTLs 1 and 2, the current collectors and the spacers have elasticity in the direction to increase the distance between the flat plate-like cell main body and each of the interconnectors, and the amount of elasticity of the spacers is larger than the amount of elasticity of the current collectors.

In fuel batteries according to PTLs 1 and 2, the electrical contact resistance between the current collector and the flat plate-like cell and between the current collector and the interconnector is reduced by utilizing the difference between the amount of elasticity of the metal current collectors in the thickness direction and the amount of elasticity of the spacers made of, for example, mica in the thickness direction. In particular, in PTL 2, the ends of the spacers protrude beyond the ends of the bent current collector. In addition, in such a configuration, when a load is added to the unit cells in the stacking direction, it is possible to prevent sintering of the current collectors due to direct contact between the cell contact portions being in contact with the flat plate-like cell and the connector contact portions being in contact with the interconnectors.

PTL 3 proposes a configuration of a current collector electrically connecting between adjacent cells, in which the current connector is composed of a plurality of first members (bulk bodies) made of an oxide ceramic fired body and one or more second members having a spring structure and made of a metal.

SUMMARY

One non-limiting and exemplary embodiment provides a solid oxide fuel cell having a stacking structure that can maintain the excellent performance even at high temperature or an electrochemical cell such as a solid oxide electrolysis cell.

In one general aspect, the techniques disclosed here feature a solid oxide fuel cell including unit cells, including: a pair of interconnectors for electrically connecting the unit cells; a membrane-electrode assembly including an electrolyte membrane and a pair of electrode layers disposed with the electrolyte membrane therebetween; a pair of current collectors disposed between the electrode layers and the interconnectors so as to be in contact with the pair of electrode layers and the pair of interconnectors, respectively, and electrically connecting the pair of electrode layers and the pair of interconnectors; and elastic bodies biasing at least one current collector of the pair of current collectors toward a corresponding electrode layer and made of austenitic stainless steel.

The present disclosure is configured as described above and causes an effect of having a stacking structure capable of maintaining excellent performance even at high temperature.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
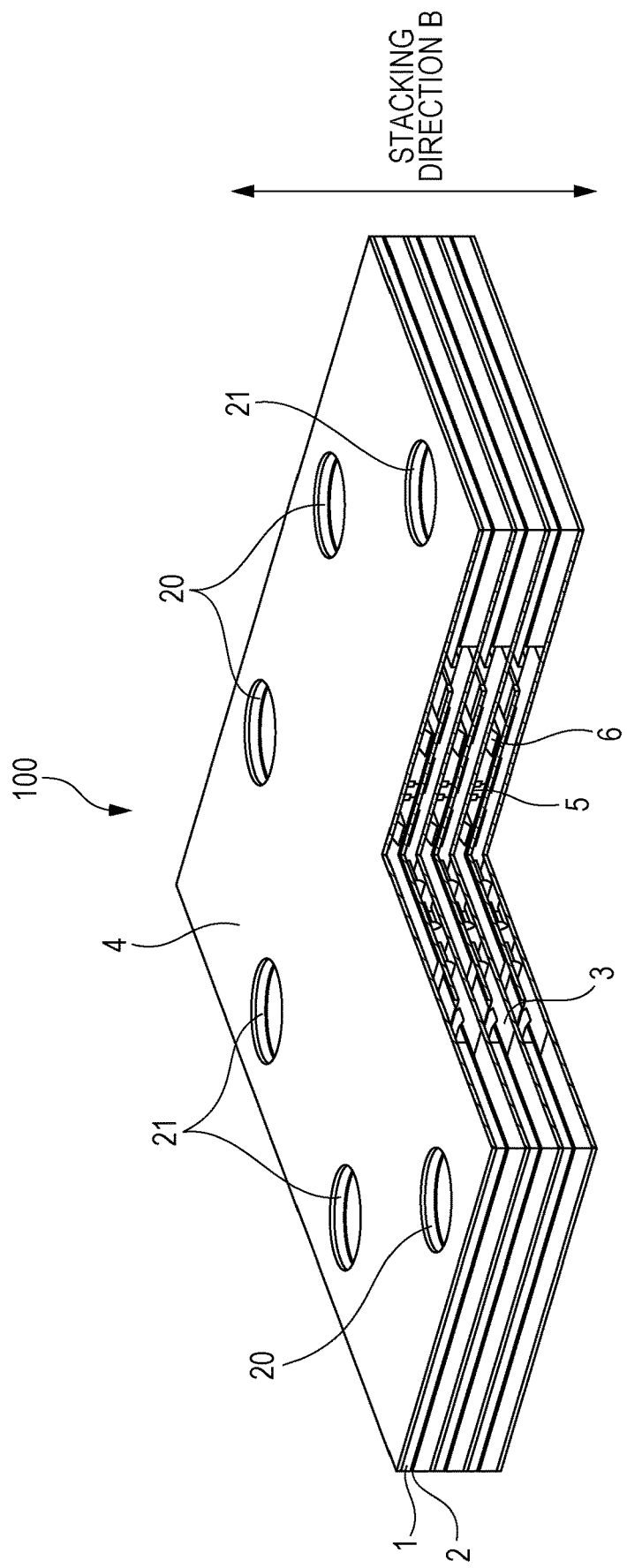
FIG. 1 is a perspective view illustrating an example of a cell stack included in a solid oxide fuel battery according to an embodiment of the present disclosure.

Underlying Knowledge Forming Basis of the Present Disclosure

The present inventors have intensively verified the fuel batteries disclosed in PTLs 1 to 3. In the fuel batteries according to PTLs 1 and 2, increases in electrical contact resistance between the current collector and the flat plate-like cell and between the current collector and the interconnector are suppressed by the amount of elasticity of each of the current collector and the spacer, in particular, by the reaction force generated by the displacement of the spacer in the thickness direction. However, it has been found that the amount of displacement of the spacer is generally small and there is a problem that it is difficult to sufficiently cope with, for example, the deformation of the flat plate-like cell and the variation due to the assembly error of the stack.

In contrast, the fuel battery according to PTL 3 includes current collectors electrically connecting between adjacent unit cells. The current collectors each include a first member made of an oxide ceramic fired body (bulk) and a second member made of a metal having electrical conductivity.

Here, since the second member of the current collector according to PTL 3 is required to have good electrical conduction properties, when the metal constituting the second member is stainless steel, ferritic stainless steel is selected. However, problems that when the second member of the current collector is made of ferritic stainless steel, at high temperature, the strength becomes insufficient, the spring property is reduced, and the electrical contact resistance is increased have been found.

Furthermore, it has been noticed that since the metal portion of the second member is coated by ceramic, there is also a problem that an inexpensive and easy connection method (such as welding) cannot be used for providing the second member.

In addition, in PTL 3, a plurality of cylindrical flat plate-like cells are aligned in a stack on the top wall of a fuel manifold, and a current collecting member intervenes between adjacent cylindrical flat plate-like cells. This current collecting member is disposed in the neighborhood of the end of the cylindrical flat plate-like cell on the fuel manifold side (base end side), and this position is a position at which the cylindrical flat plate-like cell is hardly displaced inherently. In contrast, in a flat plate-like cell, the amount of deformation of the flat plate-like cell tends to increase by start-and-stop of the fuel battery and temperature changes in various power generation modes, and it is necessary that the whole main surface of the electrode layer should be in tight contact with the current collector. Accordingly, the current collector needs to correspond to the displacement, which is larger and non-uniform, of the flat plate-like cell. However, it has been noticed that in the configuration according to PTL 3, such a problem in the flat plate-like cell is not assumed, and it is impossible to sufficiently cope with the displacement of the flat plate-like cell.

Accordingly, the present inventors have intensively verified about these problems and consequently have obtained the following findings. That is, the unit cell including a flat plate-like cell of a fuel battery is configured so as to include a pair of interconnectors, a membrane-electrode assembly disposed between the pair of interconnectors and including a fuel electrode layer, an electrolyte membrane, and an air electrode layer, a pair of current collectors electrically connecting between the interconnectors and the electrode layers, and elastic bodies bias at least one current collector of the pair of current collectors toward the corresponding electrode.

In addition, the elastic bodies are made of austenitic stainless steel, consequently, the mechanical strength of the elastic bodies can be maintained even at high temperature. The elastic bodies can therefore maintain the force biasing the current collector toward the electrode layer even at high temperature.

It has consequently been found that even at high temperature where the membrane-electrode assembly is largely displaced, the current collectors biased by the elastic bodies can maintain the electrical connection between the electrode layer and the interconnector and can reduce the electrical contact resistance therebetween to provide excellent current collection performance, and the present disclosure has been accomplished. Thus, the present disclosure provides the following aspects.

The solid oxide fuel cell according to a first aspect of the present disclosure a solid oxide fuel cell including unit cells, including: a pair of interconnectors for electrically connecting the unit cells; a membrane-electrode assembly including an electrolyte membrane and a pair of electrode layers disposed with the electrolyte membrane therebetween; a pair of current collectors disposed between the electrode layers and the interconnectors so as to be in contact with the pair of electrode layers and the pair of interconnectors, respectively, and electrically connecting the pair of electrode layers and the pair of interconnectors; and elastic bodies biasing at least one current collector of the pair of current collectors toward a corresponding electrode layer and made of austenitic stainless steel.

According to the configuration described above, since elastic bodies are made of austenitic stainless steel, it is possible to maintain the mechanical strength of the elastic bodies even at high temperature. Consequently, the elastic bodies can maintain the force biasing the current collector toward an electrode layer even at high temperature. Therefore, even at high temperature where the membrane-electrode assembly is largely displaced, the current collector biased by the elastic bodies can maintain the electrical connection between the electrode layer and the interconnector and can reduce the electrical contact resistance with the electrode layer to provide excellent current collection performance.

Therefore, the solid oxide fuel cell according to the present disclosure causes an effect capable of having a stacking structure that can maintain excellent performance even at high temperature.

Incidentally, since the electrical connection between the interconnector and the electrode layer is achieved through the current collector, it is not necessary to consider the magnitude of the electrical resistance of the elastic bodies, and the freedom in selection of the steel material as the material constituting the elastic bodies from austenitic stainless steel can be increased.

In the solid oxide fuel cell according to a second aspect of the present disclosure, the elastic bodies in the first aspect may be made of high-Cr low-Ni heat resistant austenitic stainless steel defined as ASTM-USN-S31060 and containing, by mass %, C: 0.05% to 0.10%, Si: 0.50% or less, Mn: 1.00% or less, P: 0.040% or less, S: 0.030% or less, Cr: 22.0% to 24.0%, Ni: 10% to 12.5%, N: 0.18% to 0.25%, and REM (rare-earth metal): 0.025% to 0.070%.

According to the configuration described above, since the elastic bodies can maintain the spring property even under high-temperature operation conditions, the solid oxide fuel cell can exhibit high durability and current collection performance.

In the solid oxide fuel cell according to a third aspect of the present disclosure, in the first or second aspects described above, the electrolyte membrane may be a proton conductor.

According to the configuration described above, since the electrolyte membrane is a proton conductor, for example, the operation temperature of the solid oxide fuel battery can be decreased compared to the case of an electrolyte membrane made of an oxide ion conductor. Consequently, the mechanical strength of the elastic body can be maintained, and occurrence of creep can be prevented.

In the solid oxide fuel cell according to a fourth aspect of the present disclosure, in any one of the first to third aspects described above, the surface of the elastic body may be coated by a metal or ceramic.

According to the configuration described above, since the surface of the elastic body is coated by a metal or ceramic, it is possible to prevent scattering of chromium from the austinitic stainless steel constituting the elastic body.

In an oxidant gas atmosphere, chromium scatters from the austinitic stainless steel constituting the elastic body. Accordingly, it is particularly preferable to coat the surface of the elastic body provided on the air electrode layer side by a metal, such as a metal oxide, or ceramic.

In the solid oxide fuel cell according to a fifth aspect of the present disclosure, in any one of the first to fourth aspects described above, the pair of electrode layers may be an air electrode layer and a fuel electrode layer, the pair of current collectors may be a first current collector being in contact with the air electrode layer and a second current collector being in contact with the fuel electrode layer, the first current collector may contain ferritic stainless steel, and the second current collector may contain nickel steel.

According to the configuration described above, the ferritic stainless steel-containing first current collector being in contact with the air electrode layer has improved oxidation resistance, and the nickel steel-containing second current collector being in contact with the fuel electrode layer has improved adhesion to the fuel electrode layer. Thus, the current collectors can be made of materials according to the gases passing through the air electrode layer and the fuel electrode layer, respectively.

The electrochemical cell according to a sixth aspect of the present disclosure includes a pair of interconnectors for electrically connecting between membrane-electrode assemblies, a membrane-electrode assembly including an electrolyte membrane and a pair of electrode layers disposed with the electrolyte membrane therebetween, a pair of current collectors disposed between the electrode layers and the interconnectors so as to be in contact therewith and electrically connecting between the electrode layers and the interconnectors, and elastic bodies biasing at least one current collector of the pair of current collectors toward the corresponding electrode layer and made of austenitic stainless steel.

Embodiments of the present disclosure will now be described with reference to the drawings. The embodiments described below show examples of the above-described aspects, and, for example, the shapes, materials, components, and arrangement positions of the components shown below are merely examples, and are not limited thereto.

The same or corresponding components are denoted by the same reference characters throughout the all drawings, and the description thereof may be omitted. The drawings schematically illustrate the respective components for easy understanding, and the shapes and dimensional ratios are not accurately indicated in some cases.

EMBODIMENTS

As solid oxide fuel batteries according to embodiments of the present disclosure, those including unit cells having a flat-plate shape will be described as examples, but the shapes of the unit cells (solid oxide fuel cells) of the solid oxide fuel batteries are not limited to the flat-plate shapes and may be, for example, cylindrical flat-plate shapes.

The configuration of a solid oxide fuel battery according to an embodiment of the present disclosure will be described with reference to FIGS. 1 and 2.

FIG. 1 is a perspective view illustrating an example of a cell stack 100 included in a solid oxide fuel battery according to an embodiment of the present disclosure. FIG. 2 is an exploded perspective view illustrating an example of the configuration of a unit cell 5 included in the solid oxide fuel battery according to an embodiment of the present disclosure.

As shown in FIG. 1, the cell stack 100 is configured by stacking a plurality of unit cells 5. FIG. 1 shows a configuration in which three unit cells 5 are stacked. In the cell stack 100, the same unit cells 5 are stacked, and a fastening pressure is applied to the stack in the stacking direction B (the vertical direction in the drawing of FIG. 1) to provide gas sealing.

Figure 2:
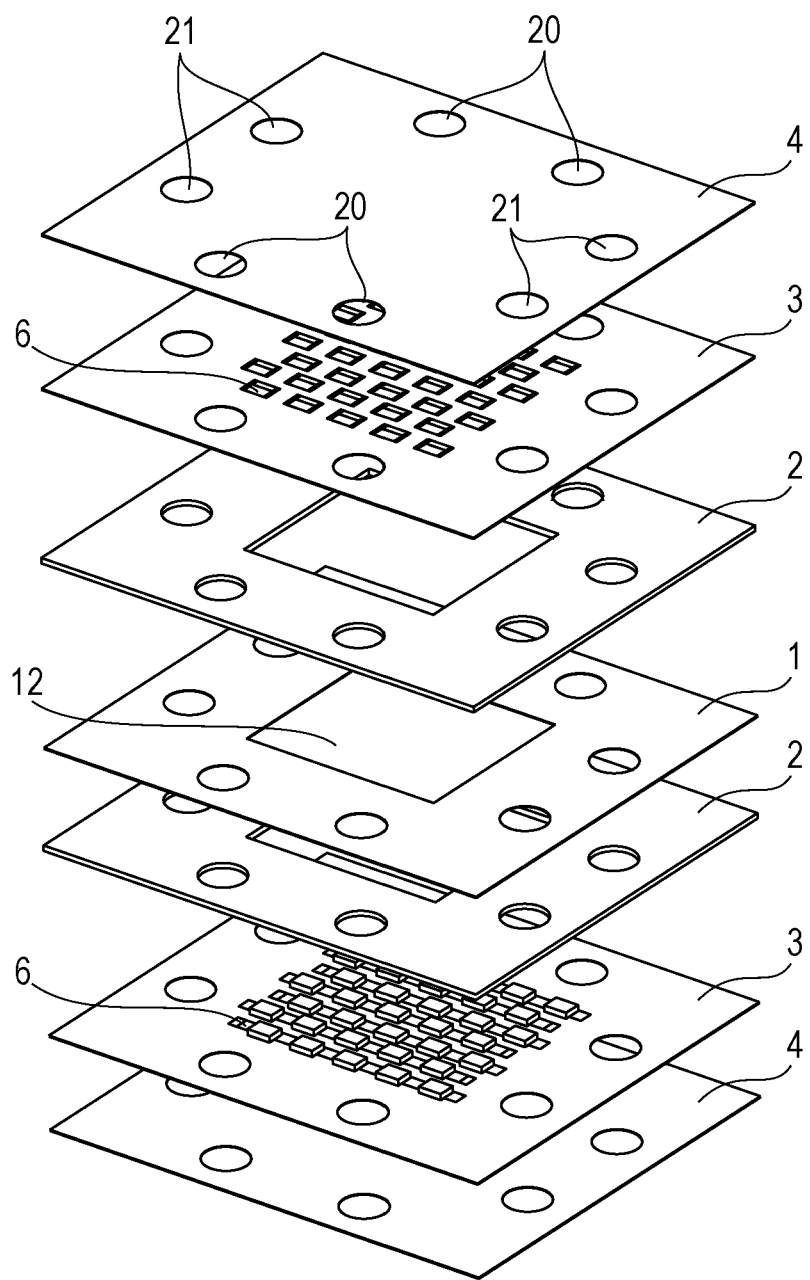
FIG. 2 is an exploded perspective view illustrating an example of the configuration of the unit cell included in a solid oxide fuel battery according to an embodiment of the present disclosure.

As shown in FIGS. 1 and 2, a plurality of through holes 20, 21 are provided along the circumference of the cell stack 100. The through hole 20 is a hole into which a shaft (not shown) for applying a fastening load to the stacked unit cells 5 is inserted. A spring mechanism is provided at least above or below the shaft so that a load is applied to the plurality of unit cells 5. The through hole 21 is a passage in which a fuel gas and an oxidant gas supplied to the cell stack 100 flow, and the openings of the through hole 21 serve as inlet-outlet ports for the fuel gas and the oxidant gas. In the present specification, the fuel gas (hydrogen) and the oxidant gas (oxygen) may be simply referred to as gases when it is not necessary to distinguish between the two.

The stacking number of unit cells 5 of the cell stack 100 varies depending on, for example, the amount of power generation required to the solid oxide fuel battery and the area of each unit cell 5. The shape of the unit cell 5 is not limited to the square flat plate as shown in FIGS. 1 and 2, and may be a circular, polygonal, or other-shaped flat plate.

As shown in FIG. 2, in the unit cell 5, a separator 1 is connected to the edge of a membrane-electrode assembly 12 and is laid over and tightly connected to frame-shaped spacers 2 each having, at the inner side, an opening having a dimension larger than the circumference of the membrane-electrode assembly 12. Current collectors 3 are combined with elastic bodies 6 such that the current collectors are biased toward the electrode layers 30 of the membrane-electrode assembly 12. The current collectors 3 are laid over and welded to or engaged with interconnectors 4 for electrical connection. The interconnectors 4 and the current collectors 3 thus-bonded to each other are connected to the separator 1 and the spacers 2 tightly connected to each other. The pair of interconnectors 4, the pair of current collectors 3, the pair of spacers 2, and the separator 1 are each provided with a plurality of holes (through holes 20, 21) at corresponding positions as shown in FIG. 2. Accordingly, the positions of the holes (through holes 20, 21) provided to each component are adjusted. A shaft is inserted into the through hole 20, and the cell stack 100 is biased along the stacking direction B of the unit cells 5.

The configuration of the unit cell 5 will now be described. As shown in FIG. 2, the unit cell 5 includes a membrane-electrode assembly 12, a pair of spacers 2, a pair of current collectors 3, and a pair of interconnectors 4.

The membrane-electrode assembly 12 includes an electrolyte membrane 14, a fuel electrode layer 15, and an air electrode layer 16. The fuel electrode layer 15 is disposed on one main surface side of the electrolyte membrane 14, and the air electrode layer 16 is disposed on the other main surface side. The fuel electrode layer 15 and the air electrode layer 16 may be simply referred to as electrode layer (or electrode layers) 30 when it is not necessary to distinguish between the two.

The electrolyte membrane 14 is made of yttria stabilized zirconia (YSZ) ceramic, which conducts oxygen ions, or yttrium-doped barium zirconate (BZY) or ytterbium-doped barium zirconate (BZYb) ceramic, which conducts protons. The operation temperature of the solid oxide fuel battery according to the embodiment is about 600° C. to 700° C. In particular, when an electrolyte membrane having proton conductivity is used as the electrolyte membrane 14, the operation temperature of the solid oxide fuel battery can be decreased to about 600° C. Accordingly, occurrence of creep in, for example, the current collector 3 and the elastic bodies 6 is prevented.

When the electrolyte membrane 14 conducts oxygen ions, the fuel electrode layer 15 can be made of a composition containing a metal, such as Ni and Fe, and at least one selected from $ZrO_2$ ceramic and $CeO_2$ ceramic composed of, for example, zirconia stabilized by at least one selected from rare earth elements such as, Sc and Y. Alternately, the fuel electrode layer 15 may be made of a metal, such as Pt, Au, Ag, Pb, Ir, Ru, Rh, Ni, and Fe. Furthermore, the fuel electrode layer 15 may be made of one of these metals or may be made of an alloy containing two or more of these metals. In contrast, when the electrolyte membrane 14 is made of BZYb ceramic conducting protons, the fuel electrode layer 15 can be made of a composition containing a metal, such as Ni and Fe, and ceramic stabilized by at least one rare earth element, such as Sc, Y, and Yb.

The air electrode layer 16 can be made of lanthanum-strontium-cobalt complex oxide (LSC), lanthanum-strontium-cobalt-iron complex oxide (LSCF), or lanthanum-strontium-iron complex oxide (LSF).

Fuel Electrode Chamber (Anode)

A fuel electrode chamber (gas distribution chamber) 17 is provided between the interconnector 4 and the fuel electrode layer 15 and is a space in which the current collector 3 is disposed and in which the fuel gas to be used in the fuel electrode layer 15 during power generation by the solid oxide fuel battery flows. The fuel electrode chamber 17 is formed by the spacer 2 connected to the fuel electrode layer 15 of the membrane-electrode assembly 12. More specifically, the fuel electrode chamber 17 is the space surrounded by the fuel electrode layer 15, the spacer 2, and the interconnector 4. In the fuel electrode chamber 17, a fuel gas containing hydrogen supplied from the outside through the through hole 21 flows.

The inside of the fuel electrode chamber 17 has a high temperature but is a reducing atmosphere. Therefore, the members disposed in the fuel electrode chamber 17 may be made of ferritic stainless steel or may be made of nickel steel. Air electrode chamber (cathode)

The air electrode chamber (gas distribution chamber) 18 is provided between the interconnector 4 and the air electrode layer 16 and is a space in which the current collector 3 is disposed and in which the oxidant gas to be used in the air electrode layer 16 during power generation by the solid oxide fuel battery flows. The air electrode chamber 18 is formed by the spacer 2 connected to the air electrode layer 16 of the membrane-electrode assembly 12. More specifically, the air electrode chamber 18 is the space surrounded by the air electrode layer 16, the spacer 2, and the interconnector 4. In the air electrode chamber 18, an oxidant gas containing oxygen supplied from the outside through the through hole 21 flows.

Since the inside of the air electrode chamber 18 is a high temperature oxidation atmosphere, ferritic stainless steel is mainly used for the members disposed in the air electrode chamber 18.

Spacer

The spacer 2 is a plate having an opening, at the center, larger than the shape of the membrane-electrode assembly 12 and made of, for example, ferritic stainless steel and having a thickness of 0.5 to 2.5 mm. The thickness of the spacer 2 is appropriately set according to the configuration of the current collector 3 and the elastic bodies 6 provided in the current collector 3.

In a pair of the spacers 2, the spacer 2 disposed on the fuel electrode layer 15 side (hereinafter may be referred to as fuel electrode layer-side spacer) is disposed at the position where the fuel gas flows. The inside of the opening of the fuel electrode layer-side spacer forms a space for accommodating the components, such as the current collector 3 and the elastic bodies 6 provided to the current collector 3, and in which the fuel gas flows.

In contrast, in a pair of the spacers 2, the spacer 2 disposed on the air electrode layer 16 side (hereinafter may be referred to as air electrode layer-side spacer) is disposed at the position where the oxidant gas flows. The inside of the opening of the air electrode layer-side spacer forms a space for accommodating the components, such as the current collector 3 and the elastic bodies 6 provided to the current collector 3, and in which the oxidant gas flows. The air electrode layer-side spacer may be made of an oxygen impermeable material, such as mica, instead of the above-mentioned ferritic stainless steel.

Current Collector

The current collector 3 electrically connects between the fuel electrode layer 15 or the air electrode layer 16 and the interconnector 4. Since the fuel electrode chamber 17 side is a reducing atmosphere, the current collector 3 (second current collector) electrically connecting between the fuel electrode layer 15 and the interconnector 4 is mainly made of nickel steel. In contrast, since the air electrode chamber 18 side is a high temperature oxidation atmosphere, the current collector 3 (first current collector) electrically connecting between the air electrode layer 16 and the interconnector 4 is mainly made of a ferritic stainless steel material having excellent oxidation resistance. The detailed configuration of the current collectors 3 will be described later.

Interconnector

The interconnector 4 is a member electrically connecting between membrane-electrode assemblies 12 and collecting the power generated by the membrane-electrode assemblies 12. The power generated by the membrane-electrode assembly 12 is supplied to the interconnector 4 through the current collector 3. The interconnector 4 is stacked on the adjacent membrane-electrode assembly 12 through the electrode layer 30 and the spacer 2 and also plays a role of dividing (sealing) the fuel gas and the oxidant gas.

The interconnector 4 is a plate made of, for example, ferritic stainless steel having a thickness of 0.2 to 2.0 mm. When the membrane-electrode assembly 12 has a flat-plate shape, the interconnector 4 is formed into a square, circular, or polygonal flat-plate shape.

Separator

The separator 1 is mainly made of ferritic stainless steel, has a thickness of 0.05 to 0.30 mm, has an opening at the center formed according to the shape of the membrane-electrode assembly 12, is connected to the upper surface of the electrolyte membrane 14 at a paste margin of about 2 to 10 mm by glass sealing or silver brazing, seals between the air flow passage and the fuel gas flow passage, and fixes the membrane-electrode assembly 12 in the unit cell 5.

The cell stack 100 is formed by stacking a plurality of unit cells 5 (for example, 15 to 50 unit cells), and the unit cells 5 are electrically connected in series. The electromotive voltage of each unit cell 5 is less than 1 V, and an electromotive voltage of about 15 to 40 V and a large direct current of 20 to 30 A can be obtained by stacking the unit cells 5. In products for typical household use, the stacking number and the area of the unit cell 5 are determined so as to be capable of generating about DC 780 W (AC 700 W). In products for large-scale facilities, the amount of power may be further larger than that for household products.

Here, as described above, the separator 1, a pair of the spacers 2, and a pair of the interconnectors 4 are each provided with holes (for through holes 20) and holes (for through holes 21) having the same shape at the respective circumferences. A shaft for applying a fastening load to the stacked unit cells 5 is inserted into the through holes 20. In contrast, the inlet side of the through hole 21 is connected to a supply pipe for supplying a high-temperature (about 600° C.) fuel gas or oxidant gas, and the fuel gas and the oxidant gas are supplied from the reformer and the air heat exchanger, respectively, provided in a fuel battery hot box described below. The supplied fuel gas and oxidant gas are appropriately distributed and are sent to each unit cell 5 and contribute to the power generation by the unit cells 5. The outlet side of the through hole 21 is connected to an exhaust pipe, and the gases are sent to a combustion chamber provided in the fuel battery hot box.

The separator 1 and the spacer 2 provided on the fuel electrode layer side are tightly fixed to each other by welding or glass sealing for preventing hydrogen leakage. Although the separator 1 and the spacer 2 provided on the air electrode layer side are tightly fixed to each other by welding or glass sealing or with a mica sheet, when the separator 1 and the spacer 2 are not electrically insulated from each other, for example, a mica sheet is selected for electrical insulation.

Fuel Battery Hot Box

The fuel battery hot box (not shown) heats the fuel gas and the oxidant gas for power generation to a high temperature (about 550° C. to 650° C.) and supplies the gases to the cell stack 100. The fuel battery hot box includes an evaporator and a reformer for generating a fuel gas (reformed gas) containing hydrogen from a raw material and water by a reforming reaction. In addition, the fuel battery hot box includes a heat exchanger for raising the temperatures of the oxidant gas, the raw material, and water. The fuel battery hot box further includes a combustion chamber for firing the off gas exhausted from the unit cell 5 to convert into combustion heat. Furthermore, the fuel battery hot box includes a housing for accommodating the cell stack 100 composed of stacked unit cells 5.

The outline of the housing is covered with a heat insulating material to reduce heat discharge. With this configuration, the power generation performance of the solid oxide fuel battery is improved. The exhaust gas exhausted from the fuel battery hot box may be used as a heat source for, for example, a hot-water supply.

As described above, the fuel battery hot box is supplied with a hydrocarbon gas as a raw material, hydrogen is generated from the raw material by a reforming reaction in the reformer, and this hydrogen reacts with oxygen in the oxidant gas in the membrane-electrode assembly 12 to generate power.

Examples of the hydrocarbon gas as the raw material gas include city gas and propane gas. The raw material gas may be, for example, a natural gas, naphtha, or coal gasification gas. In addition, the raw material gas may be a hydrogen gas or a gas mixture of a hydrogen gas and a hydrocarbon gas. As the raw material gas, a single gas may be used, or a plurality of gases may be used as a mixture or in combination. Furthermore, the raw material gas may contain an inert gas, such as nitrogen or argon.

In addition, as the raw material gas, a gas obtained by vaporizing a solid or liquid raw material may be used, or a hydrogen gas generated by reforming a gas other than the above-mentioned hydrocarbon gas may be used.

The oxidant gas is preferably air, which is safe and inexpensive, but may be a gas mixture of oxygen and another gas.

Configuration of Current Collector and Elastic Body

Figure 3:
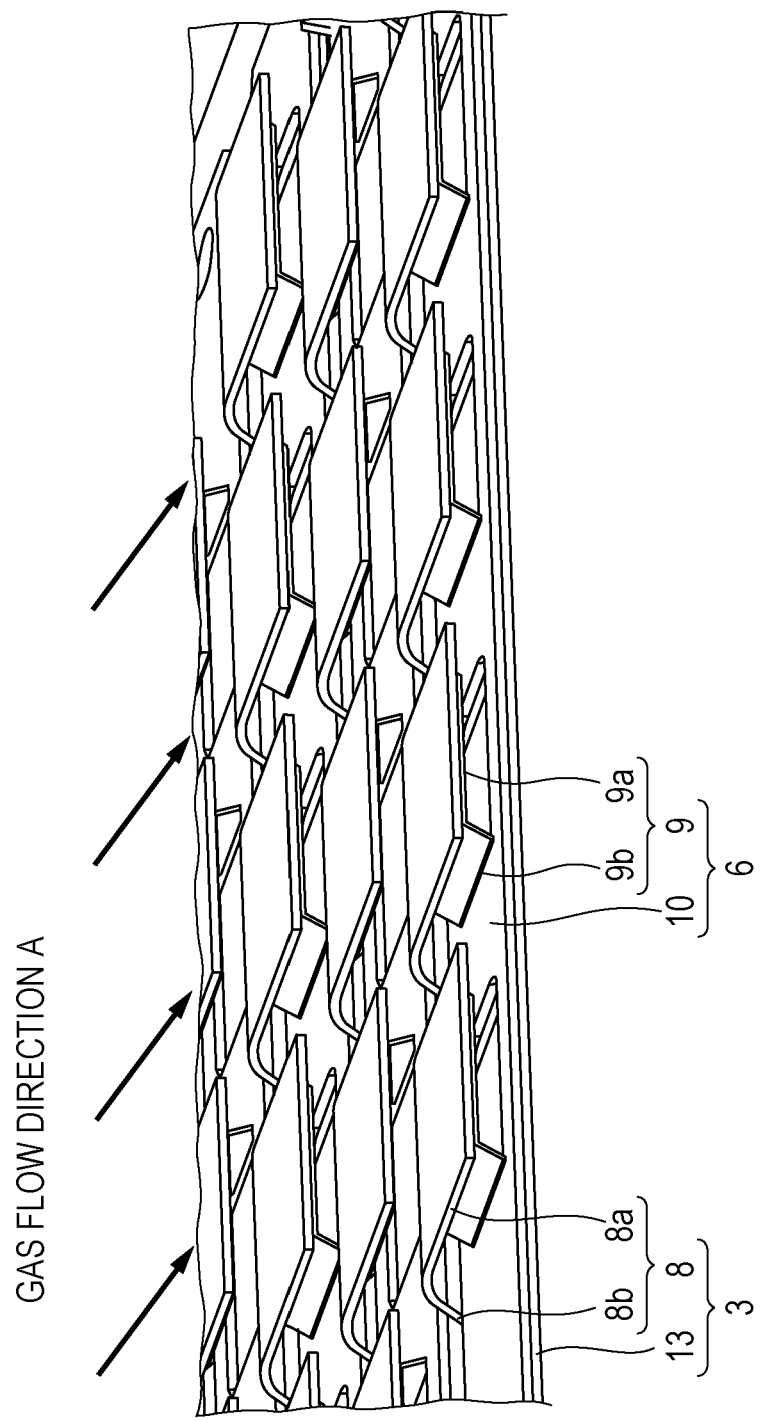
FIG. 3 is a perspective view illustrating an example of the current collector and the elastic body included in a unit cell according to an embodiment of the present disclosure.
Figure 4:
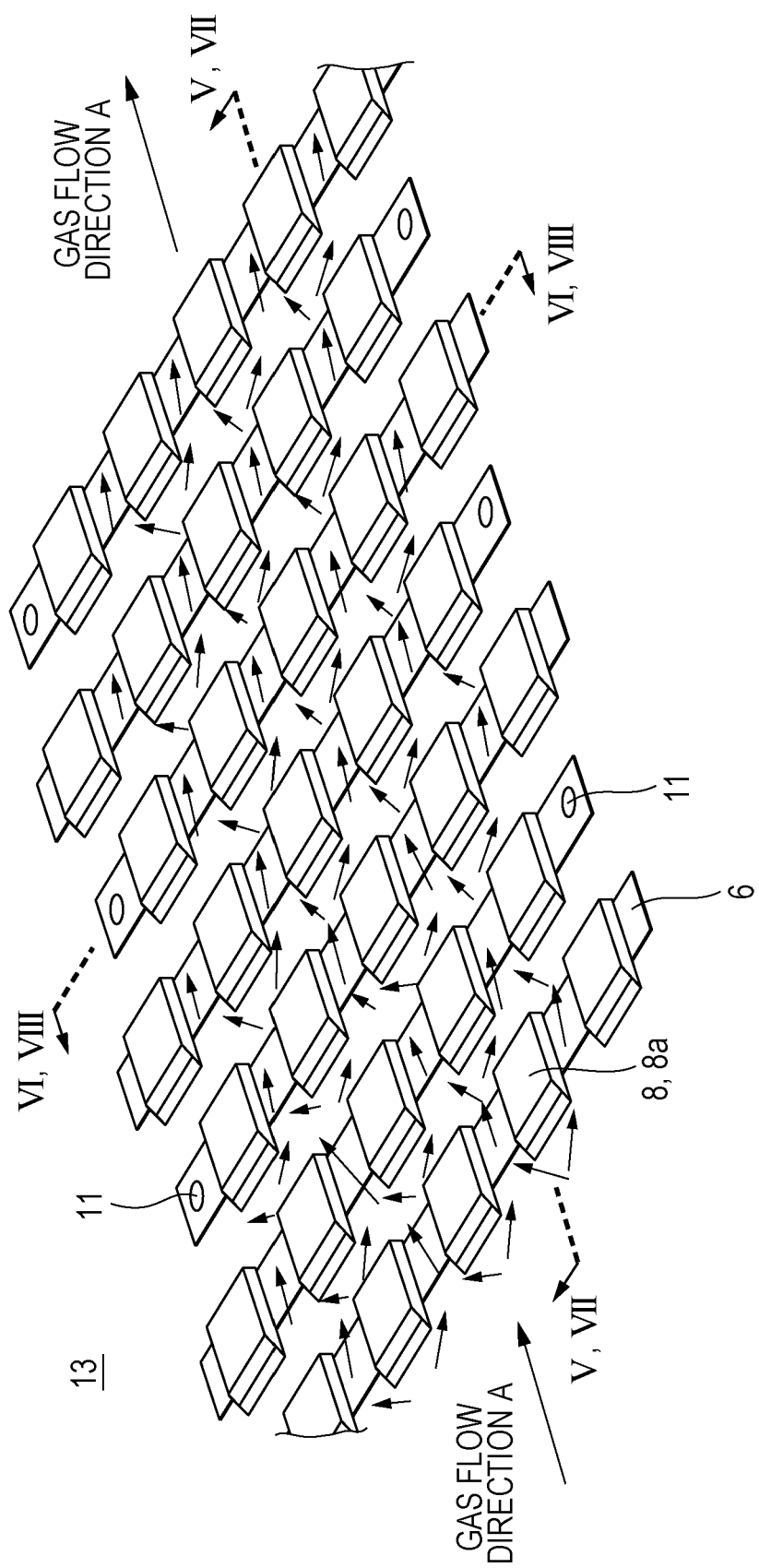
FIG. 4 is a perspective view illustrating an example of the positional relationship between the current collector and the elastic body included in a unit cell according to an embodiment of the present disclosure.

Subsequently, the detailed configuration of the current collector 3 and the elastic body 6 included in the unit cell 5 according to an embodiment of the present disclosure will be described with reference to FIGS. 3 to 6. FIG. 3 is a perspective view illustrating an example of the current collector 3 and the elastic body 6 included in the unit cell 5 according to an embodiment of the present disclosure. FIG. 4 is a perspective view illustrating an example of the positional relationship between the current collector 3 and the elastic body 6 included in the unit cell 5 according to an embodiment of the present disclosure.

Here, the stacking direction B of the unit cells 5 is referred to as the vertical direction, and a direction orthogonally crossing the stacking direction B is referred to as the horizontal direction.

As shown in FIG. 3, at least one of the pair of current collectors 3 includes a flat plate-like current collector base material (first base material surface) 13 being in contact with the interconnector 4 and current collector protruding portions 8 rising from the current collector base material 13 toward the electrode layer 30 and being in contact with the electrode layer 30.

The elastic body 6 has a spring property and is disposed between the current collector base material 13 and the current collector protruding portions 8. The current collector protruding portion 8 includes an electrode-abutting surface 8a, which is an abutting surface abutting against the electrode layer 30, and the elastic body 6 supports the electrode-abutting surface 8a.

More specifically, as shown in FIGS. 3 and 4, the current collector base material 13 having a rectangular flat-plate shape includes current collector protruding portions 8 formed by making approximately U-shaped cuts (slits) and bending the cut parts at the uncut parts (current collector bent parts 8b) connecting with the current collector base material 13 and rising the cut parts from the current collector base material 13. The current collector bent part 8b is the connection portion of the present disclosure connecting between the current collector protruding portion 8 and the current collector base material 13.

The current collector protruding portion 8 rising from the current collector base material 13 at the current collector bent part 8b is further bent to form an electrode-abutting surface 8a in a predetermined range of the end part of the current collector protruding portion 8 in such a manner that the electrode-abutting surface 8a is approximately parallel to the current collector base material 13 and abuts against the fuel electrode layer 15 or the air electrode layer 16.

The current collector protruding portion 8 protrudes, for example, about 1 mm in the stacking direction B of unit cells 5 so as to be in contact with the main surface of the fuel electrode layer 15 or the main surface of the air electrode layer 16 of the membrane-electrode assembly 12.

The elastic body 6 includes, in the elastic body base material (second base material surface) 10 having a long and narrow rectangular flat-plate shape, elastic body protruding portions 9 formed by making approximately U-shaped cuts (slits) and bending the cut parts at the uncut parts (elastic body bent parts 9b) connecting with the elastic body base material 10 and rising the cut parts from the elastic body base material 10. The elastic body protruding portion 9 is further bent to form a supporting surface 9a in a predetermined range of the end part of the elastic body protruding portion 9 in such a manner that the supporting surface 9a is in contact with the electrode-abutting surface 8a of the current collector 3 on the side opposite to the side abutting against the fuel electrode layer 15 or the air electrode layer 16 and supports the electrode-abutting surface 8a of the current collector 3. That is, as shown in FIG. 3, the elastic body protruding portion 9 has a cantilever beam-like protrusion shape.

As shown in FIG. 4, a prescribed number of the current collector protruding portions 8 are arranged at equal intervals in a direction orthogonal to the flow direction A of the gas flowing on the plane surface of the current collector 3. For example, in the example of FIG. 4, when the membrane-electrode assembly 12 has a square with a side length of 50 mm, a row of the current collector protruding portions 8 (current collector protruding portion row) is formed by arranging five current collector protruding portions 8 at equal intervals (about 10 mm). A plurality of the current collector protruding portion rows are arranged at equal intervals along the gas flow direction A. In the example shown in FIG. 4, seven current collector protruding portion rows are arranged at equal intervals (about 8 mm).

As shown in FIG. 4, the current collector protruding portion rows are arranged such that the current collector protruding portions 8 are shifted by half pitches with respect to those in adjacent current collector protruding portion rows in a direction orthogonal to the gas flow direction A. That is, in the current collector base material 13, the current collector protruding portions 8 are arranged in a staggered manner. The surface of the current collector protruding portion 8 risen from the current collector bent part 8b is provided so as to collide with the gas flowing on the surface of the current collector 3 along the gas flow direction A. Accordingly, as shown in FIG. 4, the gas flowing on the surface of the current collector base material 13 hits the current collector protruding portions 8 and flows between adjacent current collector protruding portions 8. Then, the gas hits the current collector protruding portions 8 of the current collector protruding portion row located further downstream in the gas flow direction A. Thus, the gas flows from the current collector protruding portion row located upstream in the gas flow direction A toward the current collector protruding portion row located downstream while hitting the current collector protruding portions 8. Consequently, the gas can flow on the surface of the current collector 3 in the state of being sufficiently diffused.

When the current collector 3 is disposed on the fuel electrode side, the current collector 3 can be formed from a nickel steel plate having a thickness of 0.04 to 0.2 mm. In contrast, when the current collector 3 is disposed on the air electrode side, the current collector 3 can be formed from a ferritic stainless steel plate (NCA1 or ZMG) having a thickness of 0.04 to 0.2 mm. The current collector 3 may be a punching metal, metal mesh, wire artifact, or porous metal having holes.

It is suitable that the number of the current collector protruding portions 8 is changeable according to the size of the membrane-electrode assembly 12, the diffusion resistance and draft resistance of the gas, or other factors.

The elastic body 6 is formed from, for example, a stainless steel plate having a thickness of 0.2 mm and can be a rectangular plate material having a width of about 6 mm and a length of about 50 mm. In the elastic body 6, the elastic body protruding portion 9 is provided at a position corresponding to the current collector protruding portion 8 in the elastic body base material 10.

This elastic body 6 is then inserted below the electrode-abutting surface 8a of the current collector protruding portion 8 (the side of the electrode-abutting surface 8a not in contact with the electrode layer 30), and only one end of the elastic body 6 is fixed on the current collector base material 13 by spot welding (fixing portion 11 shown in FIG. 4). The other end of the elastic body 6 is not welded and is lightly supported not to be detached by, for example, a guide member (not shown) such as a rib or a claw-shaped protruding portion (not shown).

In an embodiment of the present disclosure, a plurality of plate-like elastic bodies 6 each provided with a plurality of elastic body protruding portions 9 are prepared and are inserted into the gaps formed between the current collector protruding portions 8 and the current collector base material 13 in a skewer-like state. As shown in FIG. 4, the plate-like elastic bodies 6 are inserted alternately from opposite directions in the gas flow direction A such that the elastic body protruding portions 9 are located at positions corresponding to the current collector protruding portions 8 arranged in a staggered manner. Accordingly, the positions of the fixing portions 11 are also located alternately opposite sides of the adjacent elastic bodies 6.

Thus, since the elastic body 6 is fixed at only one end, and the other end is free, even if the elastic body 6 is made of a material having thermophysical properties, in particular, a coefficient of thermal expansion, highly different from that of the current collector 3, the elastic body 6 can be displaced to the other end side being free. Accordingly, it is possible to prevent the current collector 3 or the membrane-electrode assembly 12 from being stressed by stretching of the elastic body 6 against the current collector 3 due to displacement (expansion) of the elastic body 6 larger than that of the current collector 3 at a high temperature or contraction of the elastic body 6 too much by a decrease in temperature.

The elastic body 6 may be a punching metal, metal mesh, wire artifact, or porous metal having holes.

In the solid oxide fuel battery according to an embodiment of the present disclosure, as the current collector 3, ferritic stainless steel (CTE: about $10 \times 10^{-6}$ (/° C.)) having a low coefficient of thermal expansion (CTE) similar to that of ceramic is used. In contrast, as the elastic body 6, austenitic stainless steel (e.g., SUS 430, CTE: about $15 \times 10^{-6}$ (/° C.)) having a high coefficient of thermal expansion (CTE) but having excellent high-temperature mechanical strength is used.

Although the current collector 3 and the elastic body 6 are thus made of materials having highly different coefficients of thermal expansion, since the elastic body 6 is fixed at only one end, it is possible to prevent abnormal phenomena caused by the difference between the coefficients of thermal expansion of the two at high temperature such as during power generation by the solid oxide fuel battery. For example, when the length of the elastic body 6 is 50 mm, although the elastic body 6 expands more than the current collector 3 by about 0.15 mm at high temperature, the influence caused by a difference in coefficient of expansion can be sufficiently coped with by merely providing a play of, for example, about 0.3 mm to the guide such as a rib for positioning at the free end of the elastic body 6.

The elastic body protruding portions 9 of the elastic body 6 are, for example, disposed along the centerline of the rectangular elastic body base material 10 in the longitudinal direction and formed into a shape having an outer dimension (width×length) of about 2 mm×about 3 mm in a planar view of the elastic body protruding portion 9. This dimension is smaller than the outer dimension of the current collector protruding portion 8 in a planar view, and as shown in FIGS. 3 and 4, the elastic body protruding portion 9 and the current collector protruding portion 8 are disposed such that the elastic body protruding portion 9 is hidden by the current collector protruding portion 8 when viewed from above. Since the dimensional relationship between the current collector protruding portion 8 and the elastic body protruding portion 9 is set as described above, it is possible to prevent the elastic body 6 from coming into direct contact with the electrode layer 30 of the membrane-electrode assembly 12.

The elastic body 6 supports the electrode-abutting surface 8a of the current collector protruding portion 8 via the elastic body protruding portion 9 (protrusion) having a spring property, and the elastic body base material 10 is disposed on the current collector base material 13. That is, the elastic body 6 is disposed so as to be sandwiched between the current collector protruding portion 8 and the current collector base material 13 and support the current collector protruding portion 8 with the elastic body protruding portion 9.

Due to such a configuration, the current supplied from the membrane-electrode assembly 12 to the interconnector 4 flows through only the current collector 3. Accordingly, the electrical resistance of the elastic body 6 can be neglected. Consequently, the freedom in selection of the material forming the elastic body 6 can be increased.

The current collector 3 is configured such that the whole current collector base material 13 is in contact with the interconnector 4 and that the electrode-abutting surface 8a of the current collector protruding portion 8 is in contact with the electrode layer 30. Accordingly, the contact area between the current collector 3 and the interconnector 4 and the contact area between the current collector 3 and the electrode layer 30 are sufficiently large to sufficiently reduce the electrical resistance. Incidentally, if the contact area between the electrode-abutting surface 8a and the electrode layer 30 is about a half or more of the contact area between the current collector base material 13 and the interconnector 4, it is sufficient for electrical connection between the electrode layer 30 and the interconnector 4 without causing any problem.

In the solid oxide fuel battery according to an embodiment of the present disclosure, as described above, since the current collector protruding portion 8 is supported by the elastic body protruding portion 9, the current collector 3 can follow the displacement of the membrane-electrode assembly 12 by means of the elastic body 6. In addition, in such a configuration, the thickness of the steel material constituting the current collector 3 can be increased to, for example, 0.2 mm, whereas those in PTLs 1 and 2 are 0.03 mm. Here, in the configuration of the unit cell 5 according to an embodiment of the present disclosure, the magnitude of the electrical conduction resistance in the current collector 3 is inversely proportional to the thickness of the steel material constituting the current collector 3. Accordingly, the electrical resistance of the unit cell 5 according to the embodiment can be reduced theoretically to about one-sixth compared to that when a steel material having a thickness that is employed in PTLs 1 and 2 is applied to the configuration of the unit cell 5.

Displacement in Unit Cell

Figure 5:
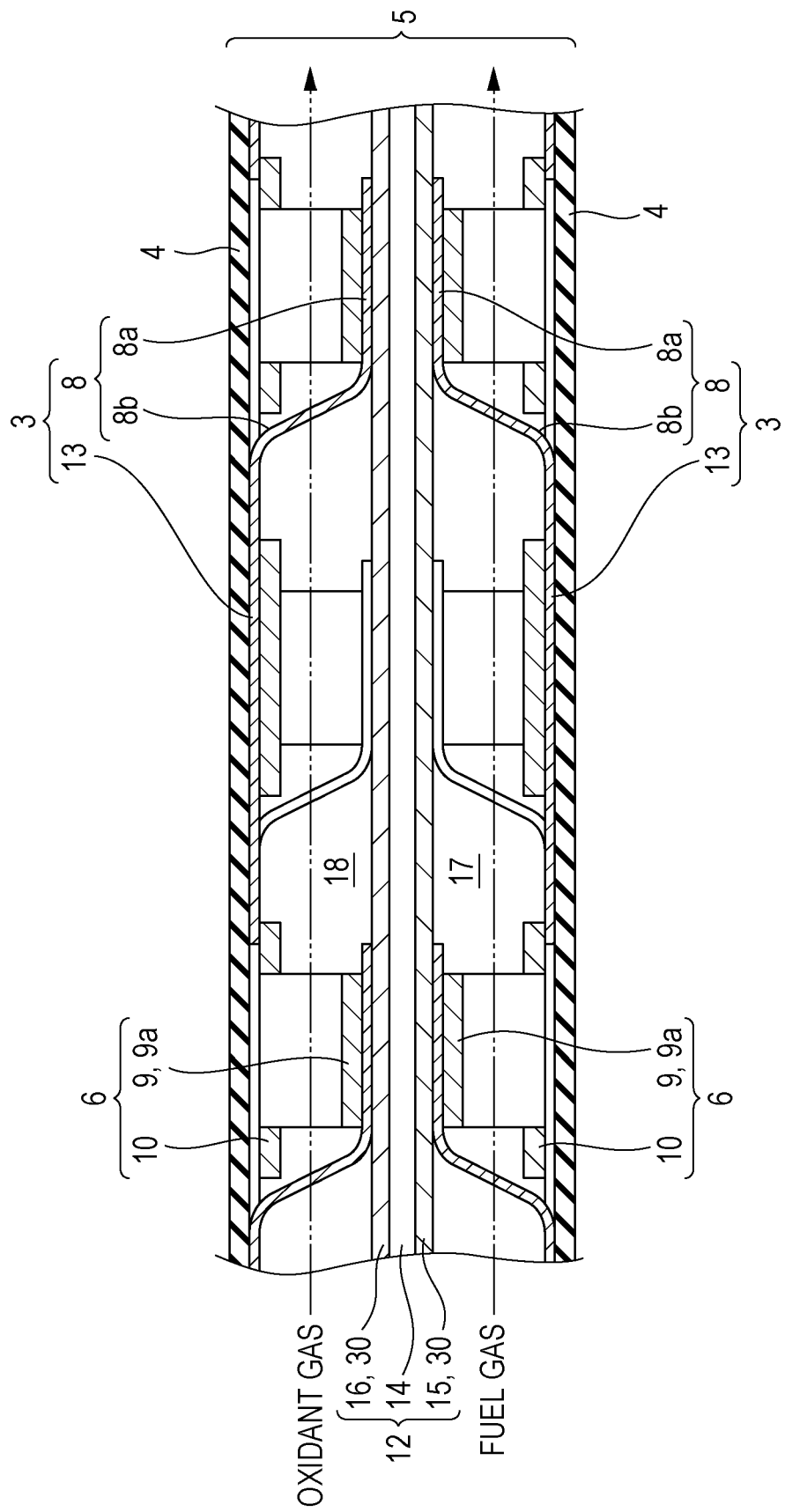
FIG. 5 is a V-V cross-sectional view of FIG. 4 schematically showing the configuration of a unit cell according to an embodiment of the present disclosure.
Figure 6:
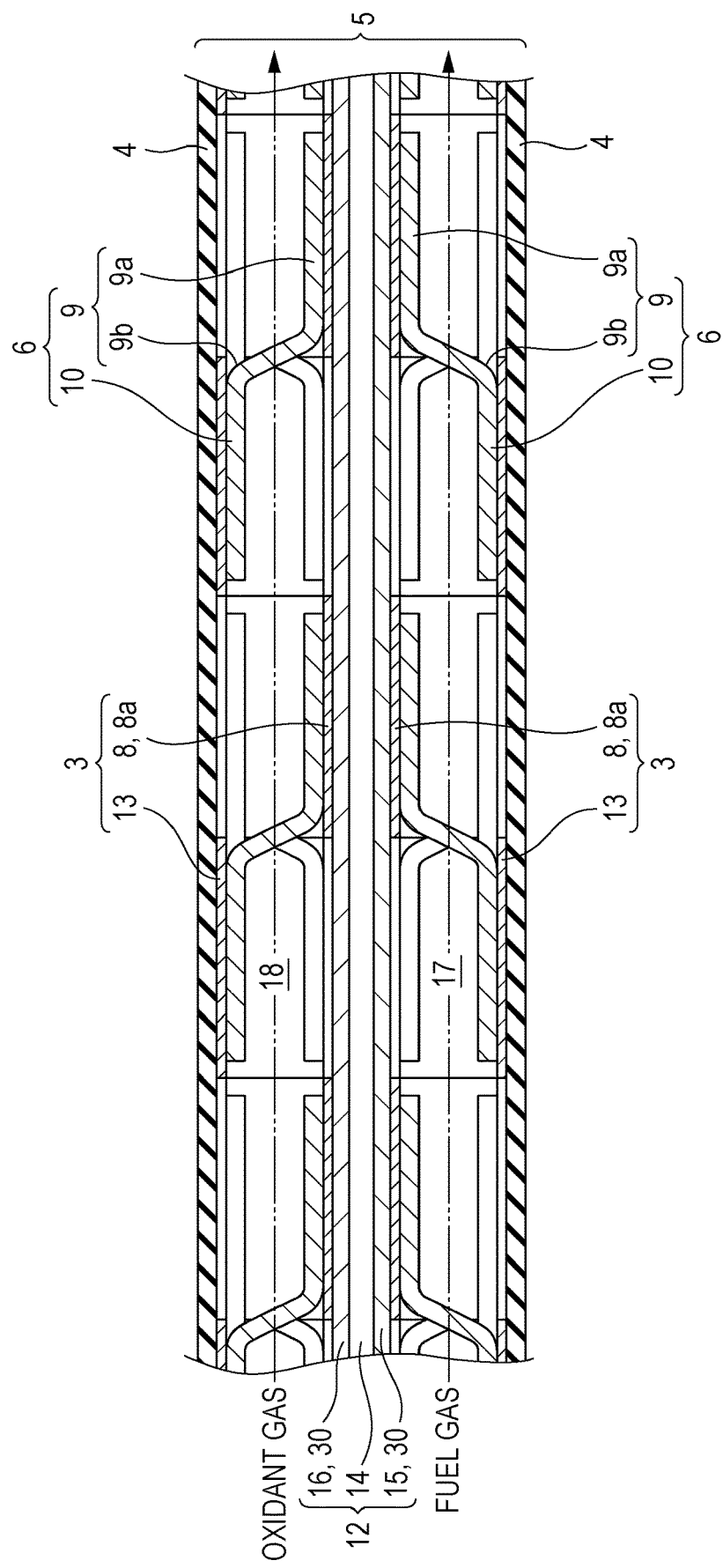
FIG. 6 is a VI-VI cross-sectional view of FIG. 4 schematically showing the configuration of a unit cell according to the embodiment of the present disclosure.
Figure 7:
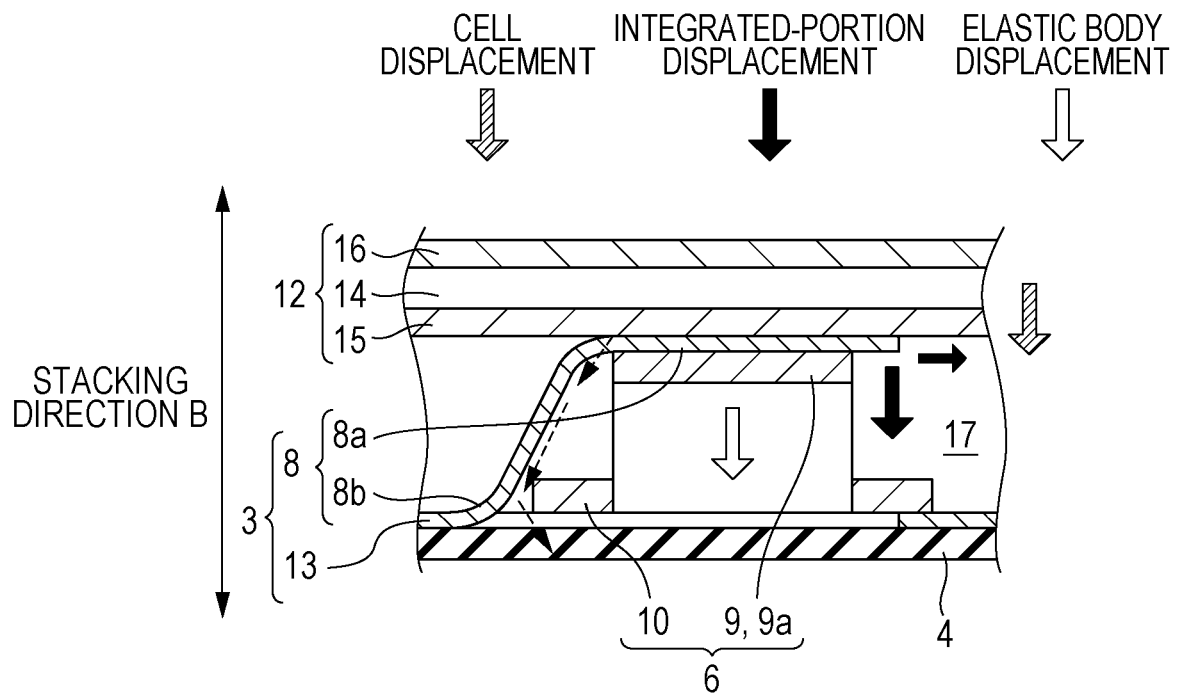
FIG. 7 is a VII-VII cross-sectional view of FIG. 4 schematically showing the displacement direction of each membrane, on the fuel electrode side, in the unit cell shown in FIG. 5.
Figure 8:
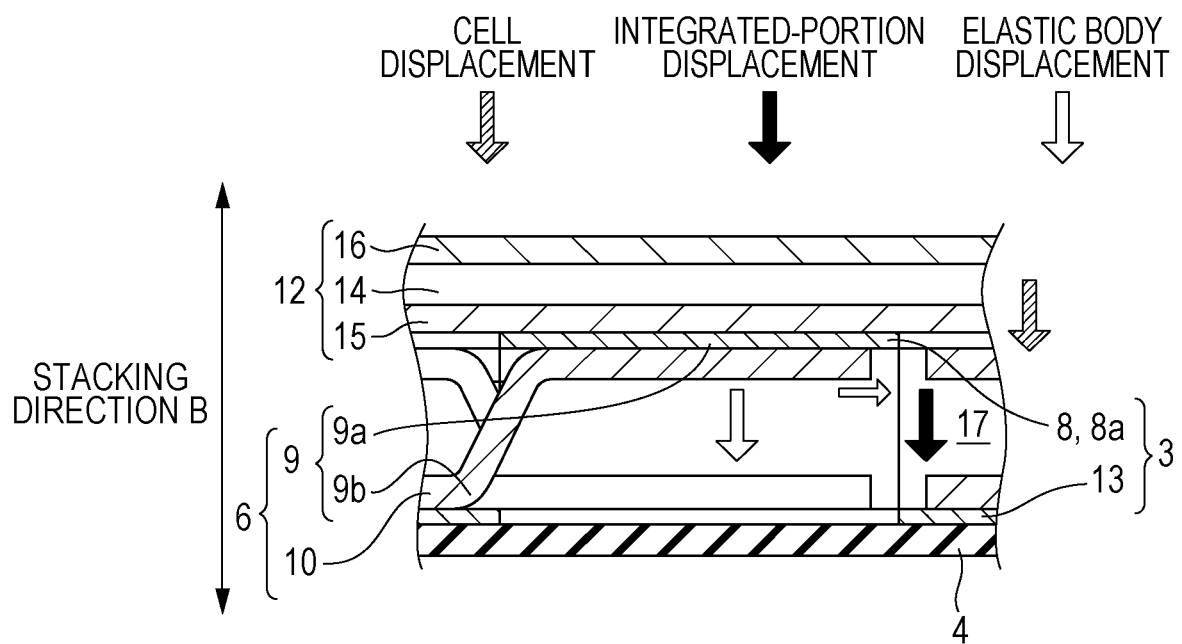
FIG. 8 is a VIII-VIII cross-sectional view of FIG. 4 schematically showing the displacement direction of each membrane, on the fuel electrode side, in the unit cell shown in FIG. 6.

The displacement direction in the vicinity of the membrane-electrode assembly 12 of the unit cell 5 will now be described with reference to FIGS. 5 to 8. FIG. 5 is a V-V cross-sectional view schematically showing the configuration of a unit cell 5 according to an embodiment of the present disclosure. FIG. 6 is a VI-VI cross-sectional view schematically showing the configuration of a unit cell 5 according to an embodiment of the present disclosure. FIG. 7 is a VII-VII cross-sectional view schematically showing the displacement direction, on the fuel electrode side, of each member of the unit cell 5 shown in FIG. 5. FIG. 8 is a VIII-VIII cross-sectional view schematically showing the displacement direction, on the fuel electrode side, of each member of the unit cell 5 shown in FIG. 6.

That is, FIG. 5 is a cross-sectional view of the unit cell 5 taken along line V-V in FIG. 4, and FIG. 7 is an enlarged cross-sectional view showing the stacking structure from the membrane-electrode assembly 12 to the interconnector 4 on the fuel electrode (anode) side of the unit cell 5 shown in FIG. 5. FIG. 6 is a cross-sectional view of the unit cell 5 taken along line VI-VI in FIG. 4, and FIG. 8 is an enlarged cross-sectional view showing the stacking structure from the membrane-electrode assembly 12 to the interconnector 4 on the fuel electrode (anode) side of the unit cell 5 shown in FIG. 6.

As shown in FIGS. 5 and 6, in the unit cell 5, an air electrode chamber 18 sandwiched between the interconnector 4 and the air electrode layer 16 and in which the oxidant gas (oxygen) flows is formed on the upper side relative to the electrolyte membrane 14. On the lower side relative to the electrolyte membrane 14, a fuel electrode chamber 17 sandwiched between the interconnector 4 and the fuel electrode layer 15 and in which the fuel gas (hydrogen) flows is formed.

In the unit cell 5 shown in FIGS. 5 and 6, the current collector protruding portion 8 and the elastic body protruding portion 9 are provided to both the air electrode chamber 18 side and the fuel electrode chamber 17 side, but either one may have a configuration in which known current collector and interconnector are stacked on the electrode layer 30.

In addition, the surfaces of the current collector 3 including the current collector protruding portion 8 and the elastic body 6 including the elastic body protruding portion 9 may be plated. The surface of the elastic body 6 may be coated by a metal, such as a metal oxide, or ceramic. However, when the current collector 3 including the current collector protruding portion 8 and the elastic body 6 including the elastic body protruding portion 9 are disposed on the fuel electrode chamber 17 side only, since the adverse effects of oxidation or chromium scattering are low, each of the surfaces need not be plated.

In the unit cell 5, the membrane-electrode assembly 12 is composed of three ceramic layers (electrolyte membrane 14, fuel electrode layer 15, and air electrode layer 16). The three ceramic layers differ from each other in thermophysical properties, such as coefficient of thermal expansion, and displace such that the central portion becomes convex by influences, such as residual stress during sintering and deformation stress during the reduction of the fuel electrode layer, regardless of whether the membrane-electrode assembly 12 has a square flat-plate shape or a round flat-plate shape. That is, the actual membrane-electrode assembly 12 is non-uniformly displaced in a mortar shape with center convex. To such non-uniform displacement, the solid oxide fuel battery according to an embodiment of the present disclosure is capable of responding, because as shown in FIGS. 5 and 6, a plurality of current collector protruding portions 8 and elastic body protruding portions 9 are arranged at equal intervals in the region where the current collector 3 is in contact with the electrode layer 30. In addition, since the plurality of current collector protruding portions 8 can abut against the surface of the electrode layer 30, the force applied to the current collector 3 by the displacement of the membrane-electrode assembly 12 can be dispersed.

Here, the displacement directions of the current collector 3 and the elastic body 6 will be described with reference to FIGS. 7 and 8 using the fuel electrode chamber 17 side as an example. In FIGS. 7 and 8, the arrows filled with hatching indicate the displacement direction of the membrane-electrode assembly 12 of the unit cell 5, the outlined arrows indicate the displacement direction of the elastic body 6 displaced by the displacement of the membrane-electrode assembly 12 of the unit cell 5, and the black arrows indicate the displacement direction of the current collector 3 displaced by the displacement of the membrane-electrode assembly 12.

It is known that in the unit cell 5, the membrane-electrode assembly 12 is deformed and displaced under various operation conditions of the solid oxide fuel battery. For example, when the temperature is raised from ordinary temperature (5° C. to 35° C.) to the operation temperature (600° C. to 700° C.) during power generation, although it varies depending on the ceramic material constituting the membrane-electrode assembly 12, the membrane-electrode assembly 12 may displace about ±0.2 to 0.4 mm in the thickness direction (the stacking direction B).

Against such a large displacement of the membrane-electrode assembly 12 in the stacking direction B, i.e., in the thickness direction, the unit cell 5 according to an embodiment of the present disclosure can correspond by the current collector protruding portion 8 that can be displaced toward the two directions as shown in FIG. 7 and the elastic body protruding portion 9 that can be displaced toward two directions as shown in FIG. 8.

That is, the current collector protruding portion 8 can be displaced in the stacking direction B and also can be displaced in the gas flow direction A. In the current collector 3, the current collector protruding portion 8 is formed by forming a slit in the current collector base material 13 and performing a bending process. On this occasion, the displacement into the two directions can be defined by the position where the current collector bent part 8*b* is formed.

When the current collector protruding portion 8 is displaced in the gas flow direction A, there is no structure that becomes an obstacle in this direction, and there is no member that is stressed by the displacement of the current collector protruding portion 8. In contrast, when the current collector protruding portion 8 is displaced, for example, as shown in FIG. 7, toward the interconnector 4 in the stacking direction B, a force in the stacking direction B is applied to the elastic body protruding portion 9.

As shown in FIG. 8, when the elastic body protruding portion 9 is displaced toward the interconnector 4 in the stacking direction B, it can also be displaced in a direction orthogonal to the gas flow direction A on the surface of the elastic body base material 10 (on the horizontal plane). That is, when a force is applied from the current collector protruding portion 8 in the stacking direction B, the elastic body protruding portion 9 having a cantilever beam-like protrusion shape is displaced in the stacking direction B and is also displaced, as shown in FIG. 8, in a direction orthogonal to the gas flow direction A on the surface of the elastic body base material 10 (on the horizontal plane) and toward the end direction of the elastic body protruding portion 9 on the side opposite to the side on which the elastic body bent part 9*b* is provided.

Although the elastic body protruding portion 9 of the elastic body 6 according to an embodiment of the present disclosure has a cantilever beam-like protrusion shape, the shape may be a clamped-clamped beam-like protrusion shape. In such a shape, the amount of displacement in a direction orthogonal to the gas flow direction A tends to increase compared to the cantilever beam-like protrusion shape.

As described above, when the current collector protruding portion 8 is displaced in the stacking direction B by the displacement of the membrane-electrode assembly 12, in the elastic body 6, the elastic body protruding portion 9 is highly deformed in the above-described direction orthogonal to the gas flow direction with an increase in displacement in the stacking direction B. Thus, the elastic body 6 can absorb the displacement of the membrane-electrode assembly 12.

In other words, the current collector protruding portion 8 and the elastic body protruding portion 9 can move in the stacking direction B of the membrane-electrode assembly 12 and in a horizontal direction orthogonal to the stacking direction B, respectively, and the direction in which the current collector protruding portion 8 is movable in a horizontal direction and the direction in which the elastic body protruding portion 9 is movable in a horizontal direction cross each other.

That is, the movable directions in respective horizontal directions of the current collector protruding portion 8 and the elastic body protruding portion 9 cross each other and do not coincide with each other. Accordingly, it is possible to prevent the current collector protruding portion 8 and the elastic body protruding portion 9 from displacing in the same direction and colliding with each other in the horizontal direction.

Furthermore, the elastic body 6 supporting and biasing the electrode-abutting surface 8a of the current collector protruding portion 8 toward the electrode layer 30 is movable not only in the stacking direction B but also in the horizontal direction as described above. Accordingly, even if the current collector 3 is displaced in the stacking direction B by the displacement of the membrane-electrode assembly 12 in the stacking direction B, the elastic body 6 moves not only in the stacking direction B but also in the horizontal direction and thereby can release part of the force applied to the current collector 3 in the stacking direction B into the horizontal direction. Consequently, the elastic body 6 can prevent the current collector 3 and the electrode layer 30 from being applied with excess stress.

The direction in which the current collector protruding portion 8 is movable in a horizontal direction and the direction in which the elastic body protruding portion 9 is movable in a horizontal direction may preferably orthogonally cross each other.

As described above, one end of the elastic body 6 is fixed to the current collector base material 13 and the other end is positioned by the guide such as a rib. Thus, since both ends of the elastic body 6 are not fixed, even if the elastic body 6 is displaced in a direction orthogonal to the gas flow direction A, the elastic body 6 can be prevented from being strongly stretched and broken.

The position at which the current collector bent part 8b is formed is also the position that can block the gas flow by the surface of the current collector protruding portion 8 risen from the current collector bent part 8b. The gas collided with the surface of the current collector protruding portion 8 risen from the current collector bent part 8b is directed in the direction in which the membrane-electrode assembly 12 is disposed.

Since the thus-supplied gas can be directed toward the membrane-electrode assembly 12 by colliding with the current collector protruding portion 8, even if the thickness (height) of the space (the fuel electrode chamber 17 or the air electrode chamber 18) in which a gas flows is set larger than before, it is possible to supply hydrogen and oxygen to the fuel electrode layer 15 and the air electrode layer 16, respectively. That is, the gas (hydrogen or oxygen) supplied from outside can be prevented from flowing and bypassing on the surface of the current collector base material 13 of the current collector 3 without directing to the electrode layer 30.

In an embodiment of the present disclosure, the displacement amount of the membrane-electrode assembly 12 in the stacking direction B has been assumed to be about ±0.3 mm. Accordingly, the displacement amounts of the current collector 3 and the elastic body 6 have been each assumed to be ±0.3 mm. In such assumption, the thicknesses (heights) of the fuel electrode chamber 17 and the air electrode chamber 18 are about 0.7 mm and about 0.5 mm, respectively. Although the thicknesses (heights) of the fuel electrode chamber 17 and the air electrode chamber 18 are larger than those of existing fuel electrode chamber and air electrode chamber, the gas collides with the current collector bent part 8b and thereby can be suppressed from flowing and bypassing on the surface of the current collector base material 13, as described above.

Furthermore, since the current collector protruding portions 8 are arranged on the current collector base material 13 in a staggered manner as described above, as shown in FIG. 4 by arrows indicating the gas flow, the gas contributed to power generation and the gas bypassed are diffusively mixed to suppress occurrence of unevenness.

Accordingly, locally uneven power generation in the membrane-electrode assembly 12 can be prevented, which can contribute to achievement of high performance and high durability. That is, during fuel gas-lean operation of high-efficient operation of power generation, the solid oxide fuel battery according to an embodiment of the present disclosure can be highly resistant to fuel exhaustion.

Incidentally, examples in which membrane-electrode assembly 12 is displaced toward the interconnector 4 in the stacking direction B have been described above. However, the membrane-electrode assembly 12 may be displaced in the opposite direction (a direction away from the interconnector 4). As in such a case, when the current collector 3 being in contact with the member-electrode assembly 12 is fixed and is not displaced without following the displacement of the membrane-electrode assembly 12 in the stacking direction B, stress is applied to the weak ceramic membrane-electrode assembly 12, causing damage. In an embodiment of the present disclosure, as described above, it is possible to correspond to the displacement of the membrane-electrode assembly 12 by displacement of the current collector protruding portion 8 of the current collector 3 and the elastic body protruding portion 9 of the elastic body 6.

In particular, when the membrane-electrode assembly 12 is displaced in a direction away from the interconnector 4 in the stacking direction B, the current collector 3 made of stainless steel or nickel steel may creep by an increase in temperature and may depart from the electrode layer 30 of the membrane-electrode assembly 12 to increase the electrical resistance. Accordingly, in the unit cell 5 according to an embodiment of the present disclosure, the elastic body 6 is made of an austenitic stainless steel material that can show a spring property by an increase in temperature. Since the elastic body 6 is thus made of an austenitic stainless steel material, the elastic body 6 can also follow the displacement of the membrane-electrode assembly 12 in a direction apart from the interconnector 4 in the stacking direction B and can obtain a biasing force pressing the current collector 3 to the electrode layer 30 of the membrane-electrode assembly 12.

In addition, when the current collector protruding portion 8 of the elastic body 6 is pressed to the membrane-electrode assembly 12 side from the interconnector 4 side, a pressing reaction force occurs. Here, since the elastic body 6 is inserted into a gap formed by the current collector protruding portion 8, the elastic body 6 presses the current collector base material 13 toward the interconnector 4 by the pressing reaction force, resulting in contribution to reduction of the electrical contact resistance between the current collector 3 and the electrode layer 30.

In addition, since the plurality of current collector protruding portions 8 are arranged at equal intervals and are in contact with the electrode layer 30, even if the displacement amount at the central portion of the main surface of the membrane-electrode assembly 12 is larger than that in the periphery thereof to show deformation in a so-called mortar shape or the membrane-electrode assembly 12 is deformed such that the main surface partially protrudes, it is possible to correspond to the displacement.

Elastic Body Material

As described above, the elastic body 6 is made of an austenitic stainless steel material. More specifically, as the austenitic stainless steel material, ASTM standards: ASTM-USN-S31060 (hereinafter referred to as AH-4) steel material can be suitably used.

That is, what the present inventors have found is the effectiveness of a high-chromium-containing stainless steel as the material of the elastic body 6 when the elastic body 6 is used as a support of the current collector 3, specifically, the effectiveness of high-Cr low-Ni heat resistant austenitic stainless steel containing REM (rare earth element: Rare-Earth Metal) defined as ASTM-USN-S31060. The characteristic point of the component composition of this high-Cr low-Ni heat resistant austenitic stainless steel containing REM is a component system of "23Cr-11Ni-N-REM-B", which contains Cr in an amount similar to that in existing typical heat resistant austenitic stainless steel SUS310S (25Cr-20Ni system), however contains Ni in an amount being about a half of that in SUS310S. Consequently, it is possible to have excellent hardness retention under a high-temperature environment and excellent heat resistance as a practical spring material up to about 600° C. by work hardening by cold working, solid solution strengthening by addition of nitrogen, and precipitation hardening of chromium nitride (CrN).

Accordingly, the case of using AH-4 steel material as the steel material of the elastic body 6 was evaluated (for example, see Yuichi Fukumura, and two other authors, "Development of Heat-Resistant Stainless Steel with Excellent Spring Properties for Exhaust Gasket", Transactions of Japan Society of Spring Research, 2015, No. 60, pp. 1-6).

Composition of AH-4

AH-4 contains, by mass %, C: 0.05% to 0.10%, Si: 0.50% or less, Mn: 1.00% or less, P: 0.040% or less, S: 0.030% or less, Cr: 22.0% to 24.0%, Ni: 10% to 12.5%, N: 0.18% to 0.25%, and REM: 0.025% to 0.070%.

Figure 9:
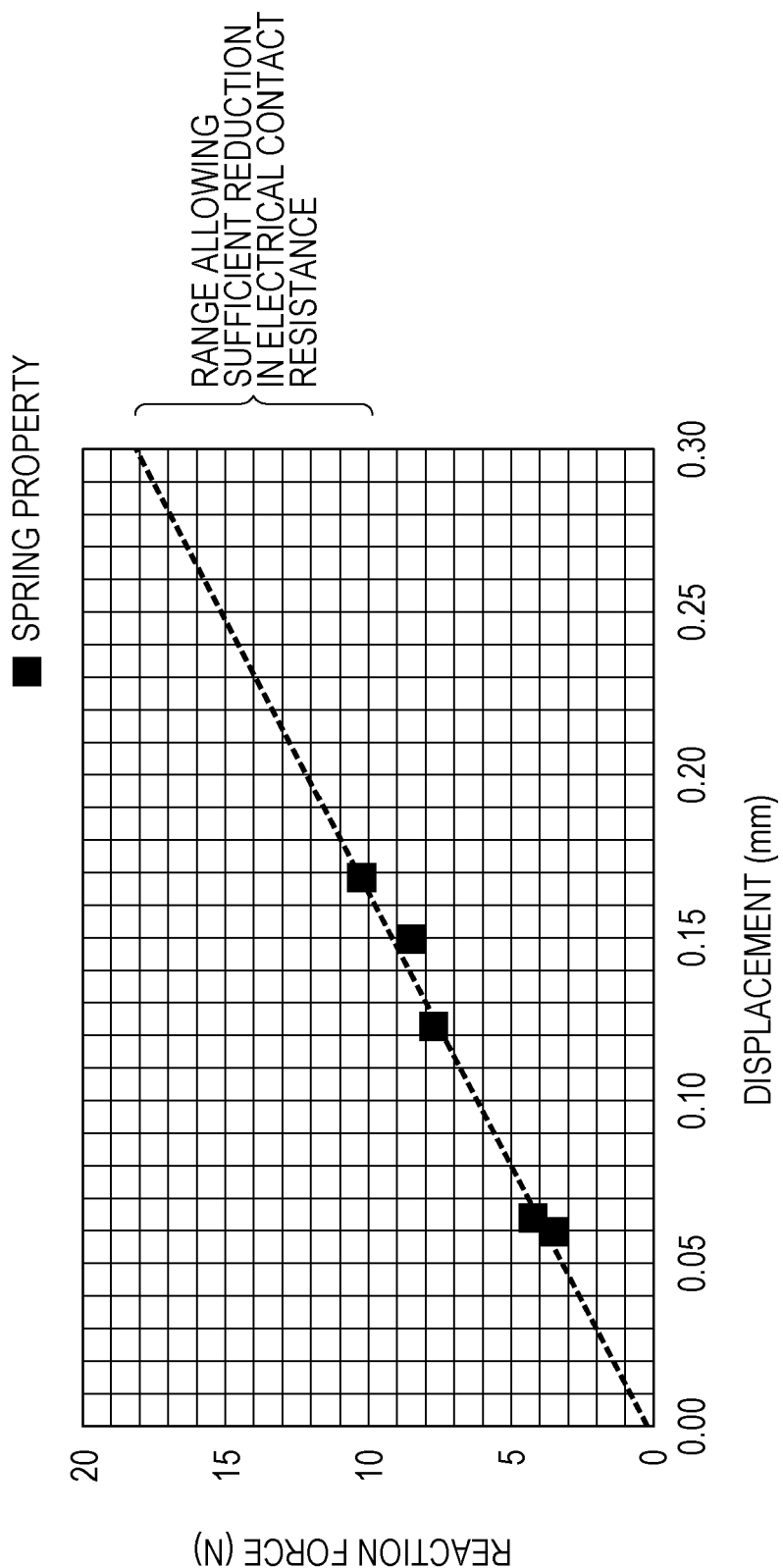
FIG. 9 is a graph showing a relationship between the amount of displacement of an elastic body and the magnitude of reaction force acting on the membrane-electrode assembly according to an embodiment of the present disclosure.

A membrane-electrode assembly 12 having a square with a side length of 50 mm and including an elastic body 6 made of AH-4 steel material having the above-mentioned composition was investigated for a relationship between the displacement (mm) of the elastic body 6 and the magnitude of reaction force pushing up the membrane-electrode assembly 12, and the relationship shown in FIG. 9 was obtained. FIG. 9 is a graph showing a relationship between the amount of displacement of the elastic body 6 and the magnitude of reaction force acting on the membrane-electrode assembly 12 according to an embodiment of the present disclosure.

As shown in FIG. 9, it is demonstrated that the magnitude of the reaction force acting on the membrane-electrode assembly 12 by the elastic body 6 is increased with an increase in the amount of displacement of the elastic body 6 by the displacement of the membrane-electrode assembly 12. In addition, the magnitude of reaction force and the electrical constant resistance in the membrane-electrode assembly 12 having a square with a side length of 50 mm were investigated, and it was found that the level of the electrical contact resistance decreases in inverse proportion to the magnitude of the reaction force when the reaction force is within a range of 0 N or more and less than 10 N. Furthermore, when the reaction force is 10 N or more, the level of electrical contact resistance was saturated and was not almost changed. That is, it was found that in the membrane-electrode assembly 12 having a square with a side length of 50 mm, the electrical contact resistance can be sufficiently reduced by pressing the current collector 3 toward the electrode layer 30 of the membrane-electrode assembly 12 with the elastic body 6 at a force of about 10 to 20 N and that the reaction force is not needed to be greater than this level.

As described above, the relationship between the displacement of the elastic body 6 made of austenitic stainless steel (AH-4) and the load was measured at ordinary temperature, and it was found that when the displacement of the elastic body 6 is about a 0.15 to 0.3 mm, the pressing force (reaction force) to the membrane-electrode assembly 12 is about 10 to 20 N, and the electrical contact resistance can be sufficiently reduced. It was also found that a force of this magnitude does not break the membrane-electrode assembly 12 made of ceramic and does not cause any strength problem.

With reference to the above verification results, the present inventors conducted a power generation stack test for unit cells under the following conditions. A hydrogen/nitrogen gas mixture as the fuel gas and air as the oxidant gas were each supplied at 100 cc/min, and a YSZ cell having a square with a side length of 50 mm was used as the membrane-electrode assembly 12. On this occasion, power generation of 0.7 to 0.8 V (600° C. to 700° C.) was observed at 0.22 A/cm$^2$ and a fuel utilization (Uf) of 80%. On this occasion, the electrical contact resistance between the electrode layer 30 and the current collector 3 was sufficiently low. The power generation was then stopped. It was consequently found that there was no breakage, such as cracking, in the membrane-electrode assembly 12 also in falling of temperature by power generation stoppage from the high-temperature state (600° C. to 700° C.) during power generation, and good power generation performance was achieved.

When the elastic body 6 made of an austenitic stainless steel material is used on the air electrode chamber 18 side, chromium scattered from the austenitic stainless steel material may adversely affect the air electrode layer 16 of the membrane-electrode assembly 12. Accordingly, when the elastic body 6 made of an austenitic stainless steel material is used on the air electrode chamber 18 side, the chromium scattering can be suppressed by forming an oxide coating film or ceramic coating film on the surface of the elastic body 6 or plating the surface. Examples of the plating method include manganese-cobalt alloy plating and nickel-cobalt alloy plating.

Modification Example

The elastic body protruding portion 9 of the elastic body 6 included in the unit cell 5 according to an embodiment of the present disclosure has a protrusion shape in which the cantilever beam rising from the elastic body base material 10 at the elastic body bent part 9b supports the supporting surface 9a of the elastic body protruding portion 9, as described above. However, the shape of the elastic body protruding portion 9 is not limited thereto.

For example, a variety of modifications are exemplified as shown in FIGS. 10 to 17. FIGS. 10 to 17 are perspective views illustrating modification examples of the elastic body 6 included in the unit cell 5 according to an embodiment of the present disclosure.

Figure 10:
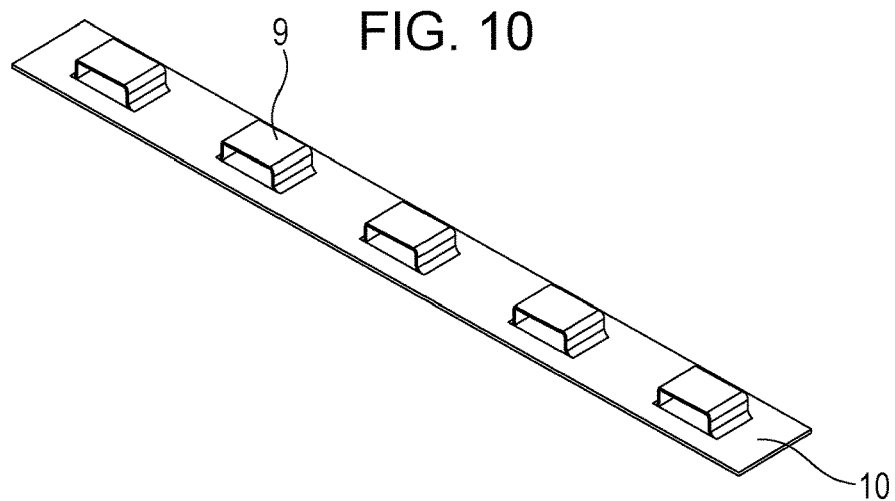
FIG. 10 is a perspective view illustrating a modification example of the elastic body included in a unit cell according to an embodiment of the present disclosure.
Figure 11:
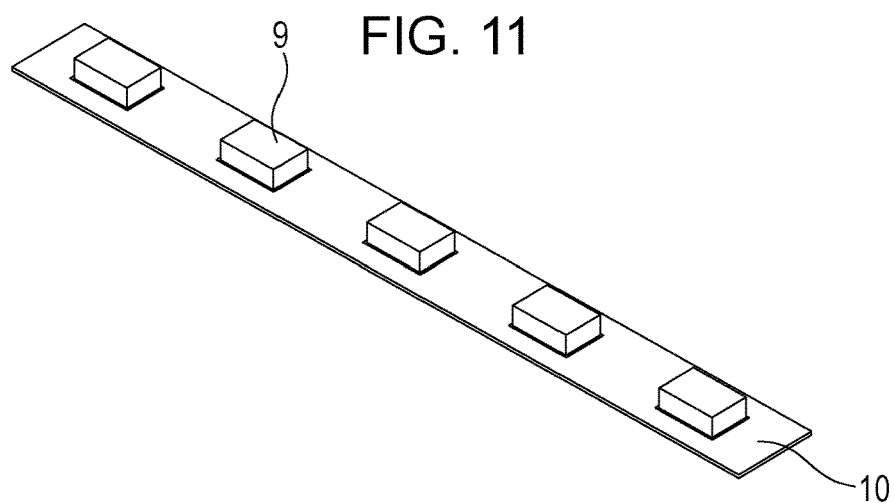
FIG. 11 is a perspective view illustrating a modification example of the elastic body included in a unit cell according to an embodiment of the present disclosure.
Figure 12:
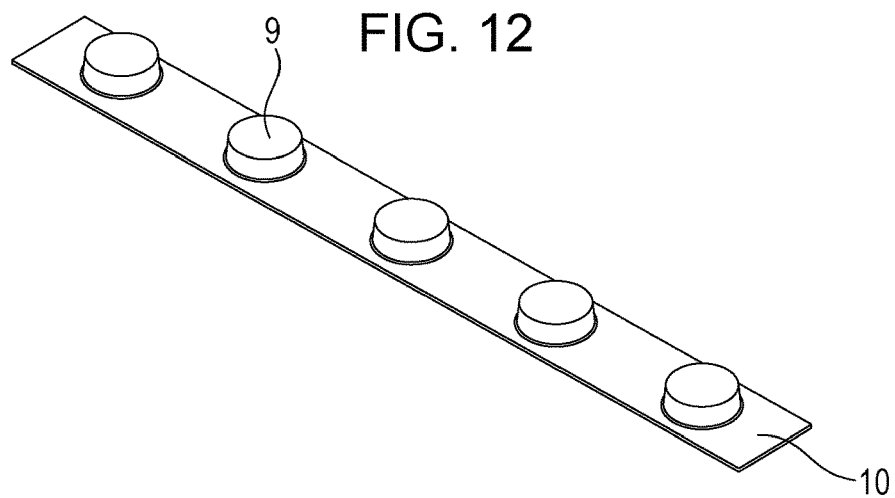
FIG. 12 is a perspective view illustrating a modification example of the elastic body included in a unit cell according to an embodiment of the present disclosure.
Figure 13:
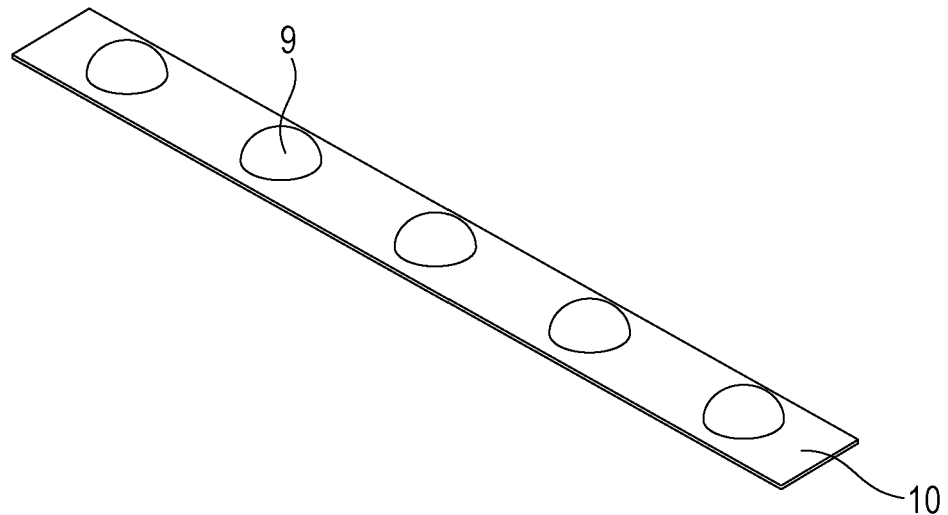
FIG. 13 is a perspective view illustrating a modification example of the elastic body included in a unit cell according to an embodiment of the present disclosure.

That is, as shown in FIG. 10, the elastic body protruding portion 9 of the elastic body 6 may have a protrusion shape supporting the supporting surface 9a with a clamped-clamped beam. Alternatively, as shown in FIG. 11, the elastic body protruding portion 9 may have a rectangular parallelepiped shape formed by press working of the elastic body base material 10 in a flat-plate shape. Alternatively, as shown in FIG. 12, the elastic body protruding portion 9 may have a cylindrical shape formed by press working of the elastic body base material 10 in a flat-plate shape. Furthermore, as shown in FIG. 13, the elastic body protruding portion 9 may have a hemispherical shape formed by press working of the elastic body base material 10 in a flat-plate shape. When the elastic body protruding portion 9 is formed into such a hemispherical shape, the supporting surface 9a is the top of the hemisphere.

Figure 14:
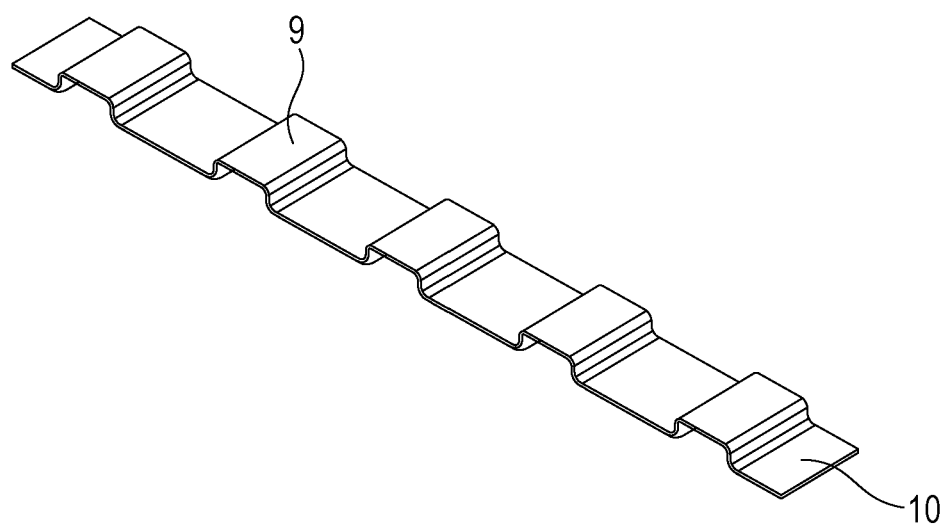
FIG. 14 is a perspective view illustrating a modification example of the elastic body included in a unit cell according to an embodiment of the present disclosure.
Figure 15:
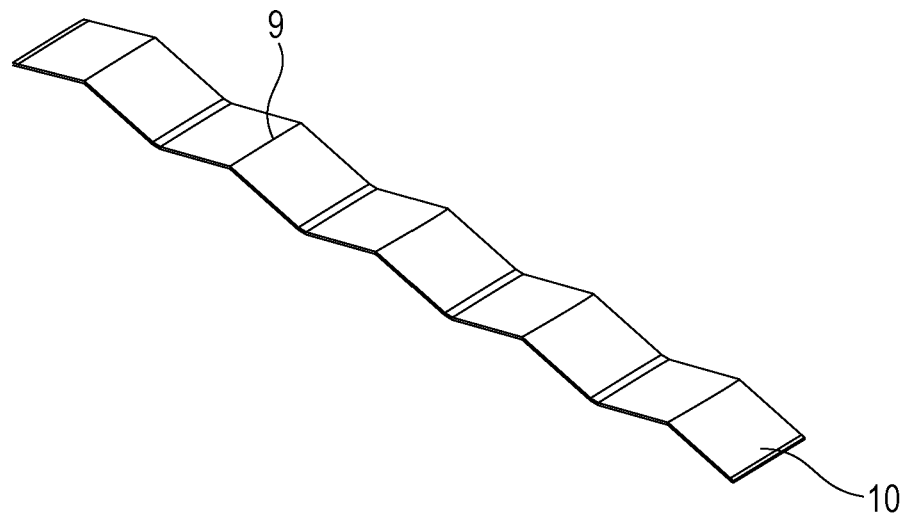
FIG. 15 is a perspective view illustrating a modification example of the elastic body included in a unit cell according to an embodiment of the present disclosure.

Alternatively, as shown in FIG. 14, the elastic body protruding portion 9 may have a convex shape supporting the supporting surface 9a with a clamped-clamped beam, formed by bending of the elastic body base material 10 in a flat-plate shape. Alternatively, as shown in FIG. 15, the elastic body protruding portion 9 may have a chevron shape having a chevron-shaped cross-section formed by bending of the elastic body base material 10 in a flat-plate shape. When the elastic body protruding portion 9 is formed into such a chevron shape, the supporting surface 9a is the line forming the peak of the chevron. The cross section formed by bending may have a sine curve shape, instead of the chevron.

Figure 16:
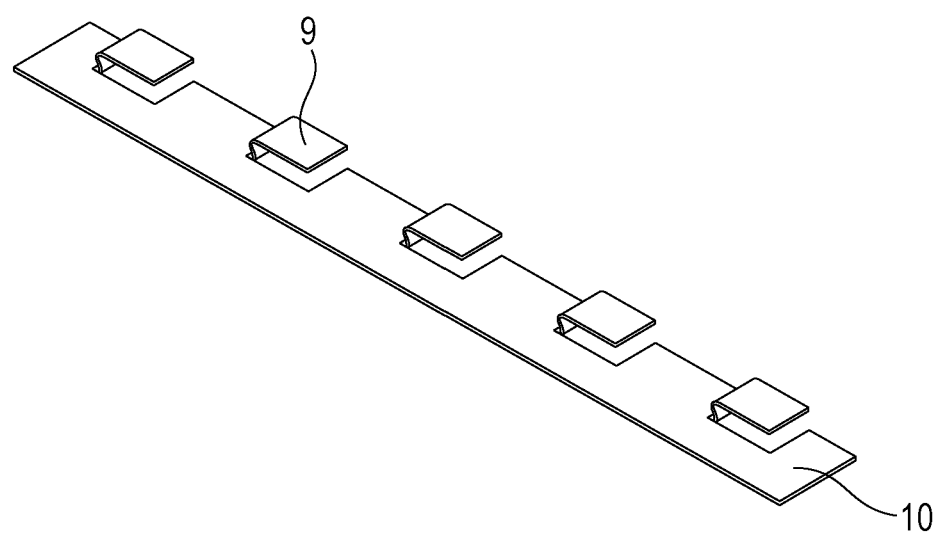
FIG. 16 is a perspective view illustrating a modification example of the elastic body included in a unit cell according to an embodiment of the present disclosure.

Although the elastic body protruding portions 9 according to an embodiment of the present disclosure are arranged at equal intervals along the centerline of the elastic body base material 10 in the longitudinal direction, as shown in FIG. 16, the elastic body protruding portions 9 may be arranged at equal intervals along a side of the elastic body base material 10 extending in the longitudinal direction. When the elastic body protruding portions 9 are thus formed, the number of slits cut in the elastic body base material 10 can be decreased compared to that when the elastic body protruding portions 9 are arranged along the centerline of the elastic body base material 10 in the longitudinal direction.

Furthermore, in the unit cell 5 according to an embodiment of the present disclosure, a plurality of elastic bodies 6 each having an elongated shape and including elastic body protruding portions 9 are arranged so as to correspond to the positions of the current collector protruding portions 8 of the current collectors 3, but the arrangement is not limited thereto. For example, as shown in FIG. 17, the elastic bodies 6 may have an integral configuration in which a plurality of elongated plates provided with elastic body protruding portions 9 are connected at one ends of the elongated plates.

When the elastic bodies 6 are thus integrally configured, the fixing portion 11 for fixing the elastic bodies 6 to the current collector base material 13 may be disposed at the connecting portion connecting the elongated plates or may be disposed at the end opposite to the connecting portion. Since the integrally configured elastic bodies 6 are thus fixed at one ends, even if displacement occurred in the elastic bodies 6, the influence of the displacement can be released to the free ends. Accordingly, occurrence of buckling or abnormal stress in the elastic bodies 6 can be prevented, and restriction on the properties, such as thermophysical properties, of the material for forming the elastic bodies 6 can be eliminated.

Figure 17:
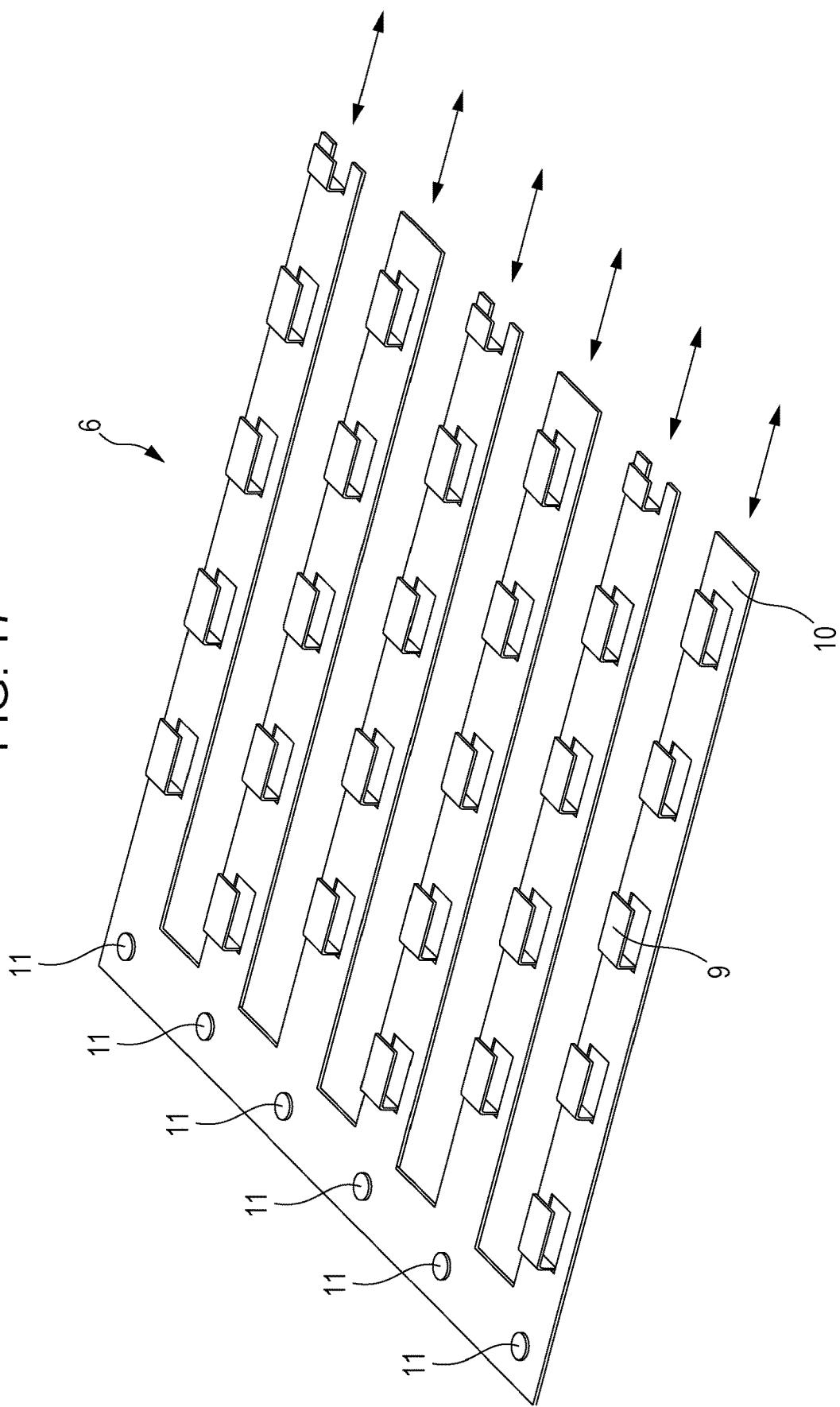
FIG. 17 is a perspective view illustrating a modification example of the elastic body included in a unit cell according to an embodiment of the present disclosure.

In the example shown in FIG. 17, although the plurality of fixing portions 11 are disposed in the connecting portion of the elastic bodies 6, the fixing portions 11 may be disposed only at the center of the connecting portion. In addition, the shape of the elastic body protruding portion 9 included in the elastic body 6 may be any one of the shapes shown in FIGS. 10 to 16.

Figure 18:
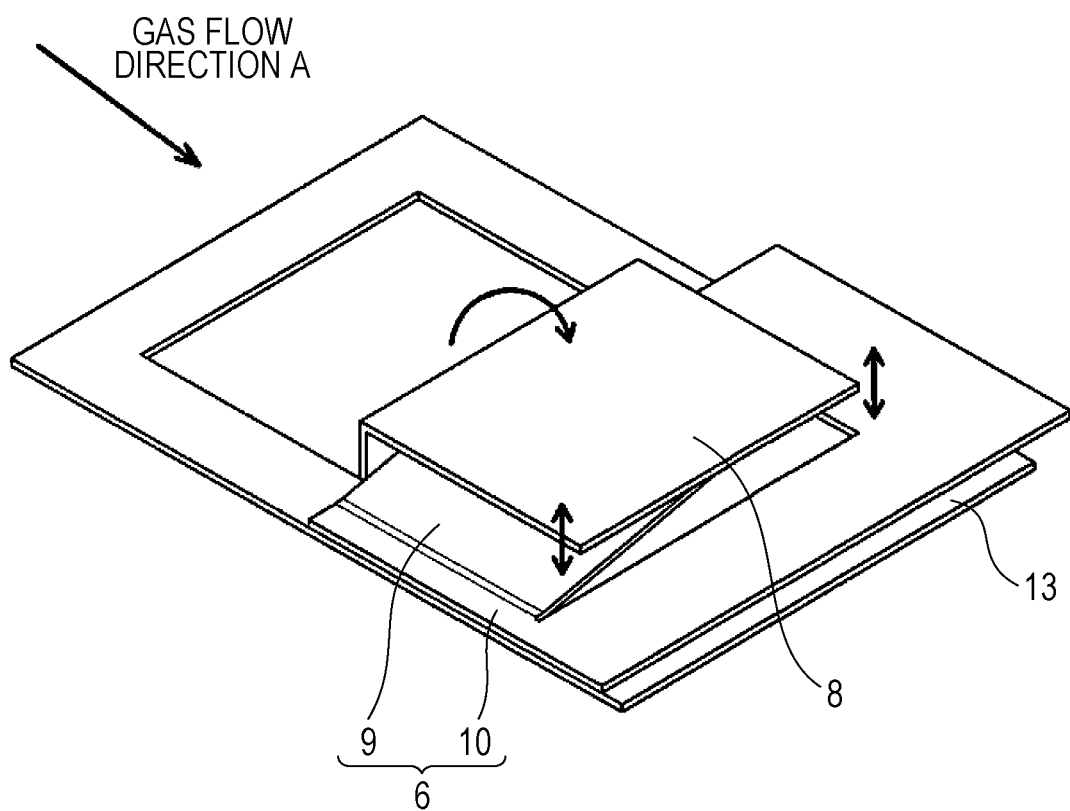
FIG. 18 is a perspective view illustrating a modification example of the current collector included in a unit cell according to an embodiment of the present disclosure.

In the current collector 3 according to an embodiment of the present disclosure, the notched portion of the current collector base material 13 for forming the current collector protruding portion 8 and the electrode-abutting surface 8a of the current collector protruding portion 8 are located so as to oppose to each other. However, as shown in FIG. 18, the portion risen by bending the current collector bent part 8b may be further bent in the direction (the arrow direction of FIG. 18) opposite to the notched portion of the current collector base material 13 to form the current collector protruding portion 8. FIG. 18 is a perspective view illustrating a modification example of the current collector 3 included in the unit cell 5 according to an embodiment of the present disclosure.

In such a configuration, the elastic body 6 is disposed on the current collector base material 13, and the current collector protruding portion 8 is then bent in the arrow direction of FIG. 18 to easily form a combination structure of the current collector 3 and the elastic body 6.

The present disclosure can be widely applied to a solid oxide fuel battery system composed of a plurality of cells or an electrochemical cell, such as a solid oxide electrolysis cell.

What is claimed is:

1. A solid oxide fuel cell including unit cells, comprising:
a pair of interconnectors for electrically connecting the unit cells;
a membrane-electrode assembly including an electrolyte membrane and a pair of electrode layers disposed with the electrolyte membrane therebetween;
a pair of current collectors disposed between the electrode layers and the interconnectors so as to be in contact with the pair of electrode layers and the pair of interconnectors, respectively, and electrically connecting the pair of electrode layers and the pair of interconnectors; and
elastic bodies biasing at least one current collector of the pair of current collectors toward a corresponding electrode layer and made of austenitic stainless steel,
wherein each of the elastic bodies includes a base material and a protruding portion, the protruding portion of the elastic bodies includes a U-shaped cut part in plane view and an uncut part, and the cut part is bent at the uncut part connecting with the elastic body base material and rising the cut part from the elastic body base material, the cut part including two bent parts including a first bent part connected to the elastic body base material and bent relative to the elastic body base material, and a second bent part formed by further bending the first bent part,
each of the pair of current collectors includes a current collector base material and a plurality of current collector protruding portions, a gap is formed between the current collector base material and each of the plurality of current collector protruding portions, and each of the elastic bodies is inserted into the gap formed between the current collector base material and each of the plurality of current collector protruding portions.

2. The solid oxide fuel cell according to claim 1, wherein the elastic bodies are made of high-Cr low-Ni heat resistant austenitic stainless steel defined as ASTM-USN-S31060 and containing, by mass %, C: 0.05% to 0.10%, Si: 0.50% or less, Mn: 1.00% or less, P: 0.040% or less, S: 0.030% or less, Cr: 22.0% to 24.0%, Ni: 10% to 12.5%, N: 0.18% to 0.25%, and REM (rare-earth metal): 0.025% to 0.070%.

3. The solid oxide fuel cell according to claim 1, wherein the electrolyte membrane is a proton conductor.

4. The solid oxide fuel cell according to claim 1, wherein surfaces of the elastic bodies are coated by a metal or ceramic.

5. The solid oxide fuel cell according to claim 1, wherein:
the pair of electrode layers are an air electrode layer and a fuel electrode layer,
the pair of current collectors are a first current collector being in contact with the air electrode layer and a second current collector being in contact with the fuel electrode layer, and
the first current collector contains ferritic stainless steel, and the second current collect contains nickel steel.

6. An electrochemical cell including unit cells, comprising:
a pair of interconnectors for electrically connecting the unit cells;
a membrane-electrode assembly including an electrolyte membrane and a pair of electrode layers disposed with the electrolyte membrane therebetween;
a pair of current collectors disposed between the electrode layers and the interconnectors so as to be in contact with the pair of electrode layers and the pair of interconnectors, respectively, and electrically connecting the pair of electrode layers and the pair of interconnectors; and
elastic bodies biasing at least one current collector of the pair of current collectors toward a corresponding electrode layer and made of austenitic stainless steel,
wherein each of the elastic bodies includes a base material and a protruding portion, the protruding portion of the elastic bodies includes a U-shaped cut part in plane view and an uncut part, and the cut part is bent at the uncut part connecting with the elastic body base material and rising the cut part from the elastic body base material, the cut part including two bent parts including a first bent part connected to the elastic body base material and bent relative to the elastic body base material, and a second bent part formed by further bending the first bent part, each of the pair of current collectors includes a current collector base material and a plurality of current collector protruding portions, a gap is formed between the current collector base material and each of the plurality of current collector protruding portions, and each of the elastic bodies is inserted into each gap formed between the current collector base material and each of the plurality of current collector protruding portions.

7. The solid oxide fuel cell according to claim 1, wherein the pair of interconnectors includes a plurality of through holes.

8. The solid oxide fuel cell according to claim 1, wherein the base material of the elastic bodies has a rectangular flat-plate shape.

9. The solid oxide fuel cell according to claim 1, wherein the protruding portion of the elastic bodies has a cantilever beam protrusion shape.

10. The solid oxide fuel cell according to claim 1, wherein the pair of current collectors include a plurality of through holes.

11. The solid oxide fuel cell according to claim 1, wherein the current collector base material has a rectangular flat-plate shape.

12. The solid oxide fuel cell according to claim 1, wherein the current collector protruding portion includes a U-shaped cut part and an uncut part, and the cut part is bent at the uncut part connecting with the current collector base material and rising the cut part from the current collector base material.

13. The electrochemical cell according to claim 6, wherein the pair of interconnectors includes a plurality of through holes.

14. The electrochemical cell according to claim 6, wherein the base material of the elastic bodies has a rectangular flat-plate shape.

15. The electrochemical cell according to claim 6, wherein the pair of current collectors include a plurality of through holes.

16. The electrochemical cell according to claim 6, wherein the current collector base material has a rectangular flat-plate shape.

17. The solid oxide fuel cell according to claim 1, wherein the elastic bodies are fixed to the current collector base material.

18. The electrochemical cell according to claim 6, wherein the elastic bodies are fixed to the current collector base material.

19. The solid oxide fuel cell according to claim 1, wherein the cut part is further bent to form a supporting surface.

20. The solid oxide fuel cell according to claim 6, wherein the cut part is further bent to form a supporting surface.

* * * * *